(12) United States Patent
Oshima et al.

(10) Patent No.: US 8,090,416 B2
(45) Date of Patent: Jan. 3, 2012

(54) RADIO RECEIVER CIRCUIT, RADIO TRANSCEIVER CIRCUIT AND CALIBRATION METHOD THEREOF

(75) Inventors: Takashi Oshima, Moriya (JP); Taizo Yamawaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 846 days.

(21) Appl. No.: 12/169,756

(22) Filed: Jul. 9, 2008

(65) Prior Publication Data
US 2009/0017776 A1    Jan. 15, 2009

(30) Foreign Application Priority Data
Jul. 9, 2007    (JP) ................................. 2007-179701

(51) Int. Cl.
*H04B 1/16* (2006.01)
(52) U.S. Cl. .................... 455/574; 455/67.11
(58) Field of Classification Search ............... 455/67.11, 455/572, 574, 339, 340, 226.1
See application file for complete search history.

(56) References Cited

U.S. PATENT DOCUMENTS

| | | | | |
|---|---|---|---|---|
| 7,295,810 | B2* | 11/2007 | Kluge et al. ................ | 455/41.2 |
| 7,792,141 | B2* | 9/2010 | Aldaz et al. ................ | 370/463 |
| 2008/0165715 | A1* | 7/2008 | Liu ............................ | 370/311 |
| 2008/0165769 | A1* | 7/2008 | Aldaz et al. ................ | 370/389 |

OTHER PUBLICATIONS

Karanicolas et al., "A 15-b 1-Msample/s Digitally Self-Calibrated Pipeline ADC," IEEE Journal of Solid-State Circuits, vol. 28, No. 12, Dec. 1993, pp. 1207-1215.
Shu et al., "A 15b-Linear, 20MS/s, 1.5b/Stage Pipelined ADC Digitally Calibrated with Signal-Dependent Dithering," 2006 Symposium on VLSI Circuits Digest of Technical Papers, 2006, pp. 1-2.
Chiu et al., "Least Mean Square Adaptive Digital Background Calibration of Pipelined Analog-to-Digital Converters," IEEE Transactions on Circuits and Systems, vol. 51, No. 1, Jan. 2004, pp. 38-46.
Oshima et al., "Fast Digital Background Calibration for Pipelined A/D Converters," IEICE Technical Report, VLD2006-138, Mar. 2007, pp. 115-120.

* cited by examiner

*Primary Examiner* — Blane J Jackson
(74) *Attorney, Agent, or Firm* — Miles & Stockbridge P.C.

(57) ABSTRACT

Conventional digital calibration type analog-to-digital converters cannot converge calibration within an preamble period of a packet signal. An analog-to-digital converter is subjected to digital calibration using a beacon signal, a polling signal, or another user signal or a signal applied from a transceiver side to a receiver side. Some or all of circuits are brought into a sleep mode in a period except data reception and the analog-to-digital converter calibration such that a signal monitor unit detects another signal to activate the circuit in the sleep mode for performing the calibration of the analog-to-digital converter for reducing the power consumption.

20 Claims, 18 Drawing Sheets

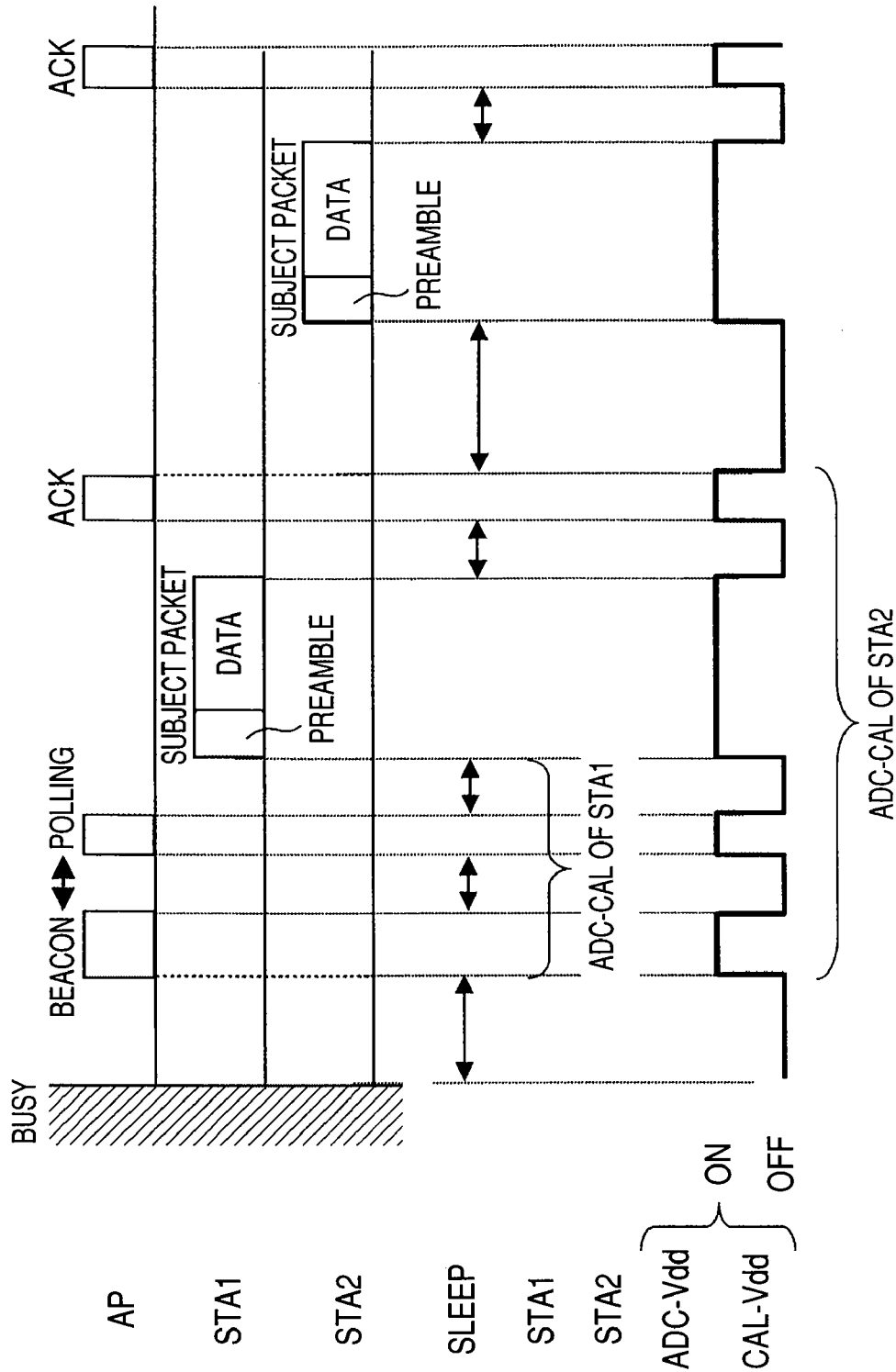

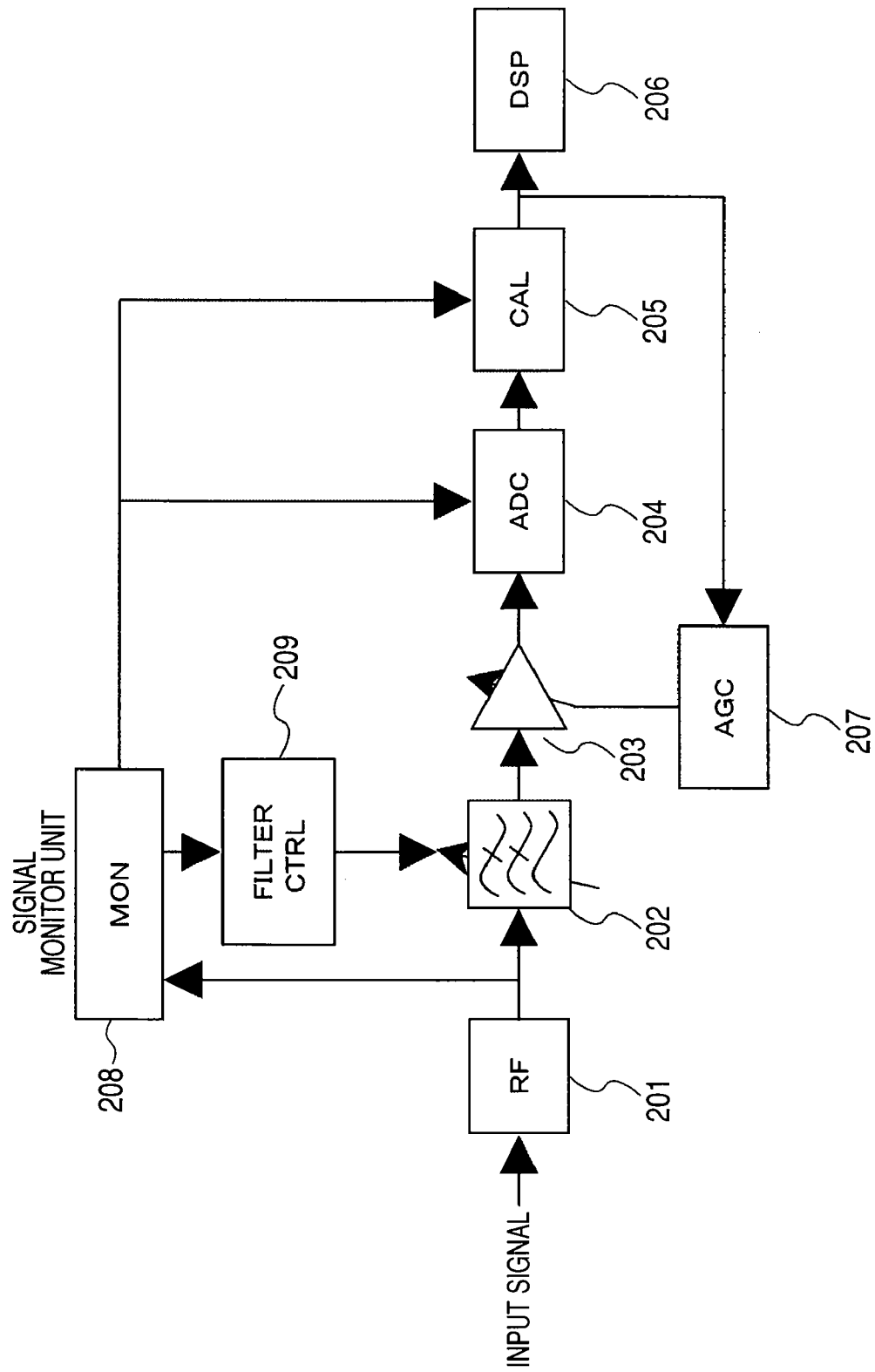

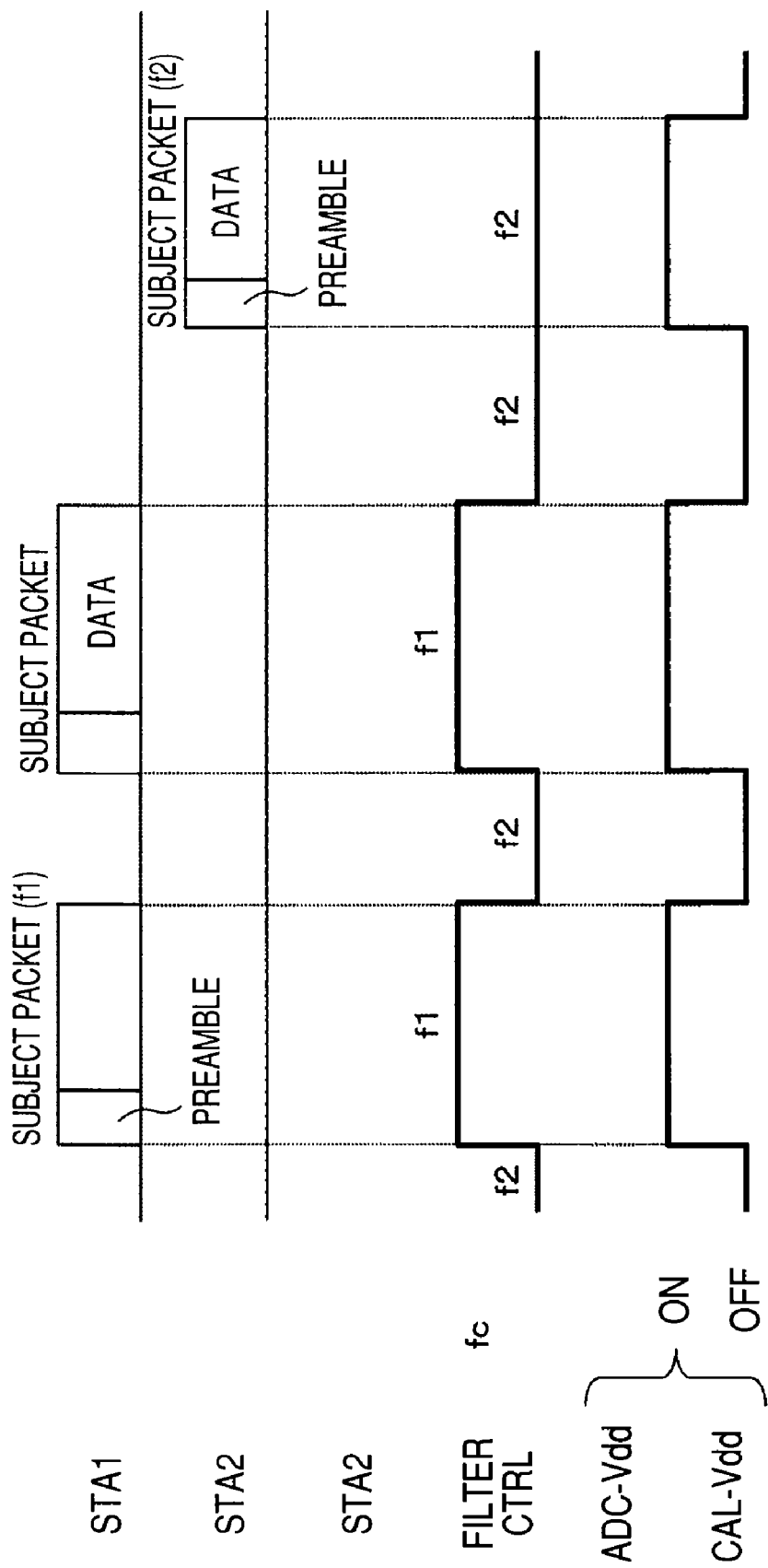

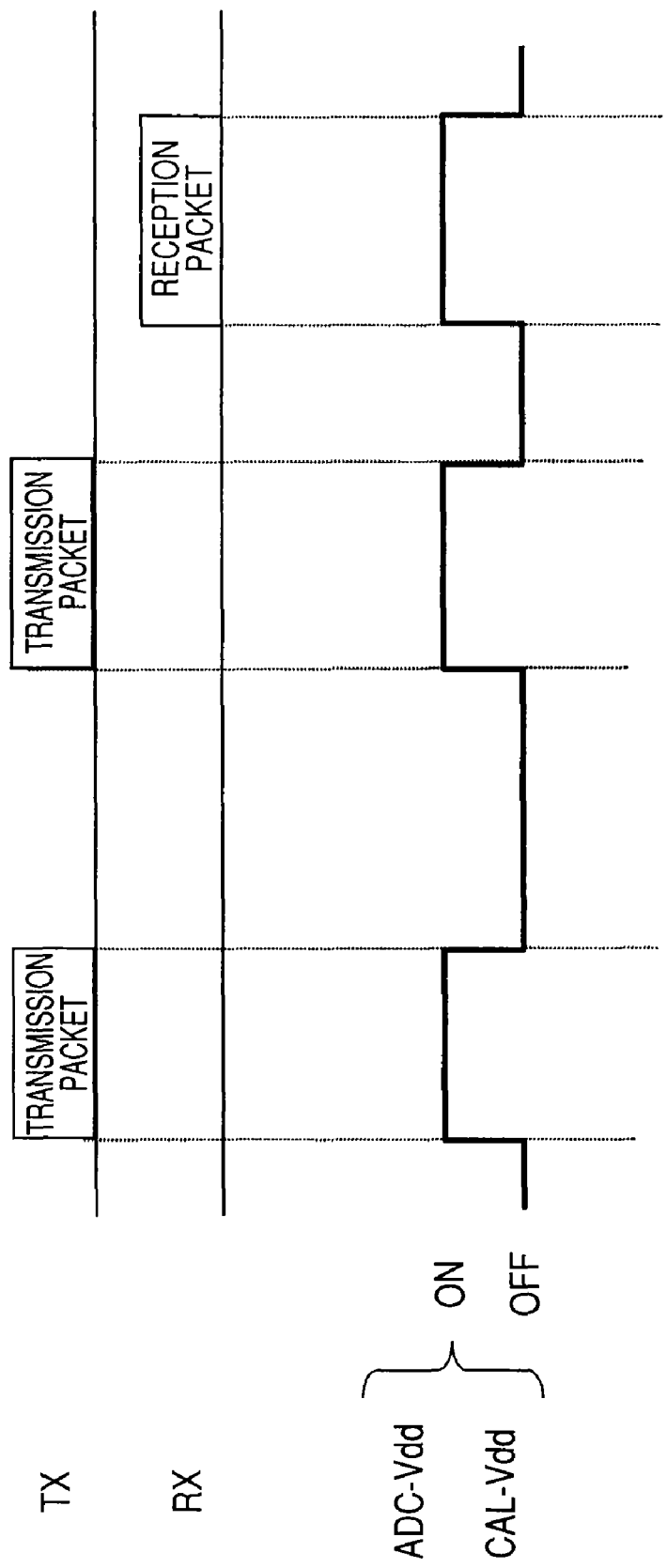

RADIO RECEIVER CIRCUIT, RADIO TRANSCEIVER CIRCUIT AND CALIBRATION METHOD THEREOF

CLAIM OF PRIORITY

The present application claims priority from Japanese application JP2007-179701 filed on Jul. 9, 2007, the content of which is hereby incorporated by reference into this application.

FIELD OF THE INVENTION

The present invention relates to a radio receiver circuit, i.e., a wireless receiver circuit having a circuit for calibrating a terminal device provided with an analog-to-digital converter to be used in a wireless LAN system and a cellular system, a radio transceiver circuit, i.e., a wireless transceiver circuit, and a calibration method thereof.

BACKGROUND OF THE INVENTION

Generally, a digital calibration type analog-to-digital converter as a calibration circuit for the analog-to-digital converter is disclosed in A. N. Karanicolas et al., "A 15-b 1-MSample/s Digitally Self-Calibrated Pipeline ADC", IEEE Journal of Solid-State Circuits Vol. 28, No. 12, pp. 1207-1215 (1993).

The digital background calibration type analog-to-digital converter is disclosed in Y. S. Shu et al., "A 15b-Linear, 20 MS/s, 1.5 b/Stage Pipelined ADC Digitally Calibrated with Signal-Dependent Dithering", 2006 Symposia on VLSI Technology and VLSI Circuits Session C25-1 (2006), and Yun Chiu et al., "Least mean square adaptive digital background calibration of pipelined analog-to-digital converters", IEEE Transactions on Circuits and Systems I Vol. 51, pp. 38-46 (2004).

The pipelined analog-to-digital converter of digital calibration type is disclosed in Oshima et al., "Fast Digital Background Calibration for Pipelined A/D Converters" IEEE Shingaku Giho VLD2006-138, 2007.

SUMMARY OF THE INVENTION

A representative structure of the generally employed wireless receiver unit is shown in FIG. 10. A signal input from an antenna is amplified in a high-frequency circuit 801, and further subjected to a frequency conversion into a lower intermediate frequency (or zero frequency). The interfering wave of the intermediate frequency signal is eliminated by a filter 802, and it is further amplified in a variable gain amplifier 803, which is input to an analog-to-digital converter 804. An automatic gain control unit 806 automatically determines the gain of the variable gain amplifier 803 based on the output level of the analog-to-digital converter 804 such that the output of the amplifier becomes equal to or slightly smaller than the input dynamic range of the analog-to-digital converter 804. The signal digitized in the analog-to-digital converter 804 is subjected to the required processing in the digital signal processing unit 805, that is, filtering, demodulation, and higher layer processing. When the intermediate frequency is not zero, the filter 802 is formed as the bandpass filter at the intermediate frequency as the center. When the intermediate frequency is equal to zero (direct conversion), the filter 802 is formed as the low-pass filter. The analog-to-digital converter 804 shown in FIG. 10 is not allowed to perform the calibration.

The analog-to-digital converter used in the generally employed wireless system as shown in FIG. 10 is not required to exhibit high resolution nor high sample rate. The analog-to-digital converter has been operated with sufficiently low power consumption requiring no calibration.

Recently, the demand for the wireless broadband system has been increasing, and as a result, the data transmission rate of the wireless LAN system has been increasing, which is expected to reach 100 Mbps or higher as specified by IEEE 802.11n standard. The standardization of the wireless LAN system at 1 Gpbs or higher has been started since 2007. Meanwhile, the data transmission rate of the cell phone has also been increasing, which is expected to be 1 Gbps in the static state, and 100 Mbps in the mobile state for the fourth generation cell phone.

The analog-to-digital converter installed in the wireless RF-IC is required to be operated at the high sample rate in addition to the high resolution demanded by existing wireless LAN and the cell phone for the purpose of coping with the higher transmission rate of the wireless system as described above.

Generally, the broad band operational amplifier or op-amp with high gain is required for realizing the analog-to-digital converter with high resolution at high sample rate, thus enlarging the power consumption.

The digital calibration analog-to-digital converter has been employed in order to overcome the aforementioned difficulty. The digital calibration type analog-to-digital converter uses the low-performance op-amp to reduce power consumption, and cancels the resultant conversion error by digital calibration.

The digital calibration type analog-to-digital converter disclosed in the above A. N. Karanicolas et al. is not capable of performing calibration and analog-to-digital conversion simultaneously. So the time for performing the specific calibration is required to be set. When the aforementioned process is applied to the wireless system, the calibration has to be performed in the interval between incoming packets. For this, the incoming timing of the packet has to be preliminarily obtained, which makes the wireless system structure complicated. During the period for receiving the packet, the calibration cannot be converged, thus failing to cope with the change in characteristic of the analog-to-digital converter caused by fluctuation in the temperature or the supply voltage.

The use of the digital background calibration type analog-to-digital converter as disclosed in the above Y. S. Shu et al. and Yun Chiu et al. has been proposed for solving the aforementioned problem. In the process disclosed in the above Y. S. Shu et al. uses the pseudo random signal for calibration. Accordingly, the convergence time for calibration is elongated, failing to converge within the preamble period of the packet, or complicating the structure of the calibration circuit.

The process disclosed in the above Yun Chiu et al. uses the simply structured calibration circuit. However, the calibration cannot be converged in the non signal period, thus failing to converge the calibration within the preamble period of the packet. Referring to FIG. 11, the preamble period of each of the respective subject packets is set to 48 μS, and the data period is set to 1 ms. Likewise the aforementioned process, the process disclosed in the above Oshima et al. fails to converge the calibration within the preamble period.

As described above, generally, the convergence time for the digital calibration of the analog-to-digital converter is long, and the calibration cannot be sufficiently performed in zero-signal period. The incidence of failing to converge the calibration within the preamble period of the packet signal is likely to be high.

It is an object of the present invention to provide an analog-to-digital converter and a wireless transceiver circuit capable of performing digital calibration to be converged within a preamble period of a packet signal with low power consumption in such wireless system as the wireless LAN, the cellular phone, or the cellular system.

The present invention provides a radio (wireless) receiver circuit comprising: a high frequency circuit; a low frequency circuit connected to an output side of the high frequency circuit; an analog-to-digital converter connected to an output side of the low frequency circuit; a calibration unit connected to an output side of the analog-to-digital converter; and a signal monitor unit to monitor a reception signal received in the high frequency circuit, wherein the signal monitor unit has a function to monitor a state of a signal transmitted or received in a wireless system and a function to operate the calibration unit before reception of a packet signal addressed to a subject station using the signal.

The present invention allows calibration of the high resolution and high sample rate digital calibration type analog-to-digital converter suitable for the next generation wireless system to converge before end of the preamble period of the packet signal required to be received while reducing power consumption of the wireless transceiver.

In the CSMA/CA system such as the wireless LAN, the base station transmits the polling signal to the terminal station prior to periodic broadcasting of the beacon signal from the base station, or reception/transmission of the subject packet signal. The terminal station constantly monitors (carrier senses) existence of the packet signal from the other terminal station except in the power save mode.

The respective embodiments of the present invention entirely or partially uses the aforementioned signals, or the signal applied from the transceiver side to the receiver side to perform digital calibration of the analog-digital converter so as to be converged within the preamble period upon reception of the subject packet signal. At least a part of the circuits is brought into the sleep mode in a period except data reception and analog-to-digital converter calibration for the purpose of reducing the power consumption. In the aforementioned state, the signal monitor unit detects the other signal, and activates the circuit in the sleep mode so as to calibrate the analog-to-digital converter.

Depending on the usage, the input signal period for calibration may be short, and accordingly, the digital calibration may be converged within the calibration period of the subject packet signal addressed to the subject station, or after the elapse of the calibration period.

BRIEF DESCRIPTION OF THE DRAWINGS

FIG. 3B is an explanatory view showing an effect of the terminal station provided with the wireless receiver circuit according to the first embodiment of the present invention;

FIG. 4A is a block diagram of a wireless receiver circuit according to a second embodiment of the present invention;

FIG. 4B is an explanatory view showing an operation of the second embodiment;

FIG. 6B is an explanatory view showing an operation of the fourth embodiment;

DETAILED DESCRIPTION OF THE PREFERRED EMBODIMENTS

Figure 1:
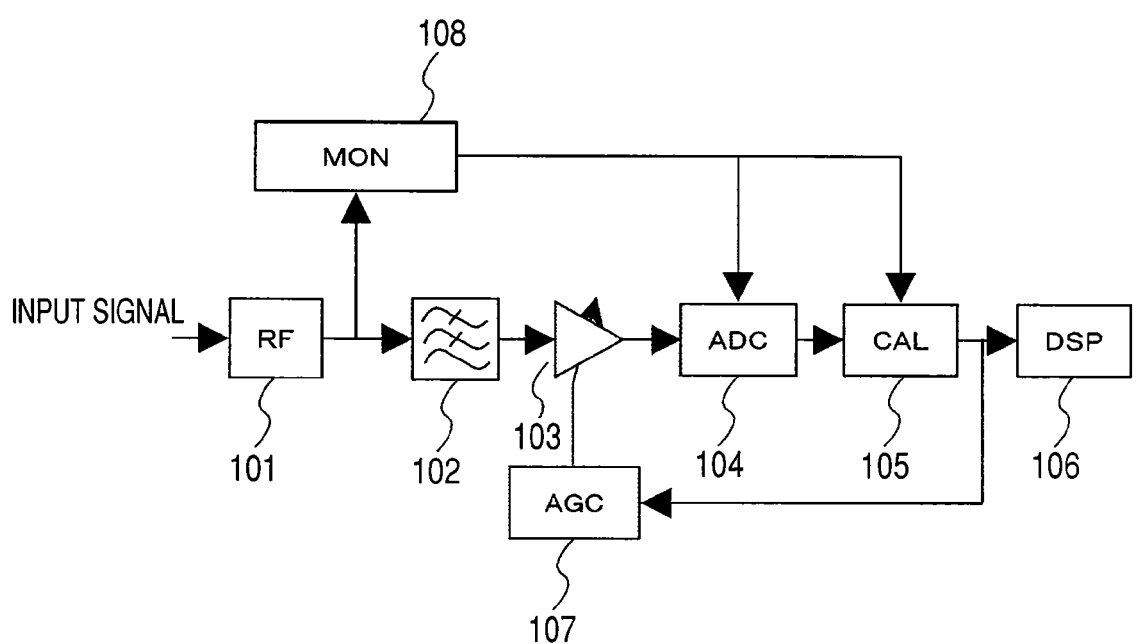
FIG. 1 is a block diagram of a wireless receiver circuit according to a first embodiment of the present invention.

Embodiments of the present invention will be described in detail referring to the drawings.

First Embodiment

A first embodiment of the present invention will be described referring to FIGS. 1 to 3.

FIG. 1 is a block diagram of a wireless receiver circuit according to the first embodiment of the present invention. The wireless receiver circuit of the embodiment includes a high frequency circuit 101, a low frequency circuit (a filter 102, a variable gain amplifier 103, and an automatic gain control unit 107) connected to an output side of the high frequency circuit, an analog-to-digital converter 104 connected to an output side of the low frequency circuit, a digital calibration unit 105 for performing calibration to improve the effective resolution of the analog-to-digital converter, a digital signal processing unit 106 formed of a digital signal processor, and a signal monitor unit 108 for detecting a reception signal. The signal monitor unit 108 determines with respect to presence/absence, or type of the reception signal, and controls operations of the analog-to-digital converter, the digital calibration unit and other circuits based on the determination results.

The digital calibration unit 105 transmits a packet signal addressed to the subject station or the other station, and such reception signal as a beacon signal and a polling signal supplied through the wireless system to an input section of the analog-to-digital converter 104 at a sufficient amplitude level for calibrating the analog-to-digital converter.

The signal input from an antenna is amplified in the high frequency circuit 101, and subjected to frequency conversion into a lower intermediate frequency (or zero frequency). The intermediate frequency signal has the interfering wave component eliminated by the filter 102 of the low frequency circuit, and then amplified in the variable gain amplifier 103 so as to be input to the analog-to-digital converter 104. An output of the analog-to-digital converter 104 is input to the digital calibration unit 105. The digital calibration unit 105 calibrates the conversion error contained in the output of the analog-to-digital converter 104 so as to be output. The automatic gain control unit 107 automatically determines the gain of the variable gain amplifier 103 such that the output of the amplifier becomes equal to or slightly smaller than the input dynamic range of the analog-to-digital converter 104.

The digital signal calibrated in the digital calibration unit 105 is subjected to the required processing, for example, filtering, demodulation, and higher layer processing in the digital signal processing unit 106. The analog-to-digital converter 104 realizes the low power consumption by reducing the power consumption of the op-amp in the inner circuit, and allows the digital calibration unit 105 to calibrate the resultant conversion error to realize the analog-to-digital converter with high resolution at the high sample rate while keeping low power consumption.

The output side of the high frequency circuit 101 is connected to the signal monitor unit 108 for determining with respect to presence/absence or type of the signal. Based on the determination result of the signal monitor unit 108, operations of the analog-to-digital converter 104 and the digital calibration unit 105 are controlled. Under the aforementioned control, the supply voltage may be controlled, or at least a part of operations may be stopped. However, the present invention is not limited to the aforementioned control.

The specific structure of the main components of the wireless receiver circuit will be described referring to FIGS. 2A to 2E.

Figure 2A:
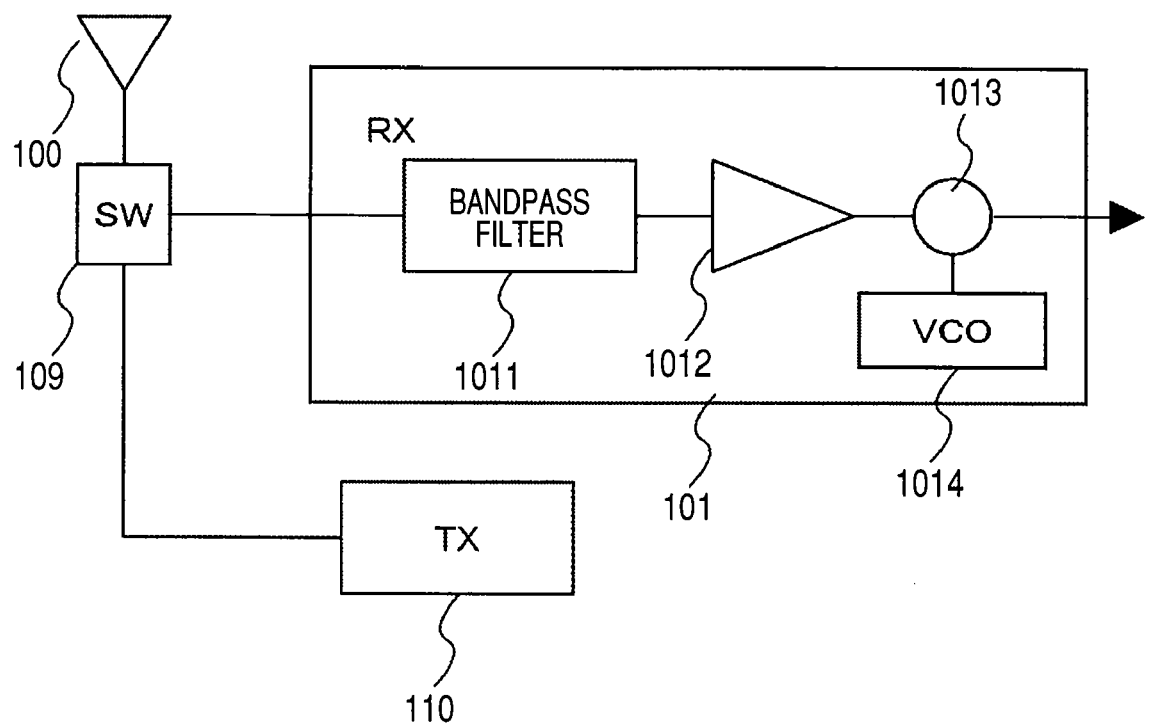
FIG. 2A is a view showing a structure of a high frequency circuit of a receiver circuit according to the first embodiment of the present invention.

FIG. 2A shows an exemplary structure of the high frequency circuit 101. The high frequency circuit 101 includes a bandpass filter 1011, a low noise amplifier 1012, a mixer 1013, and a VCO 104. FIG. 2A also shows an antenna 100, a transmission/reception switching unit 109, and a transceiver circuit 110. Among reception signals input from the antenna 100 to the high frequency circuit 101, only the signal in a specific frequency band is allowed to pass the bandpass filter 1011, amplified in the low noise amplifier 1012, and further subjected to the frequency conversion into the lower intermediate frequency (or zero frequency) in the mixer 1013 so as to be output as an IF signal.

Figure 2B:
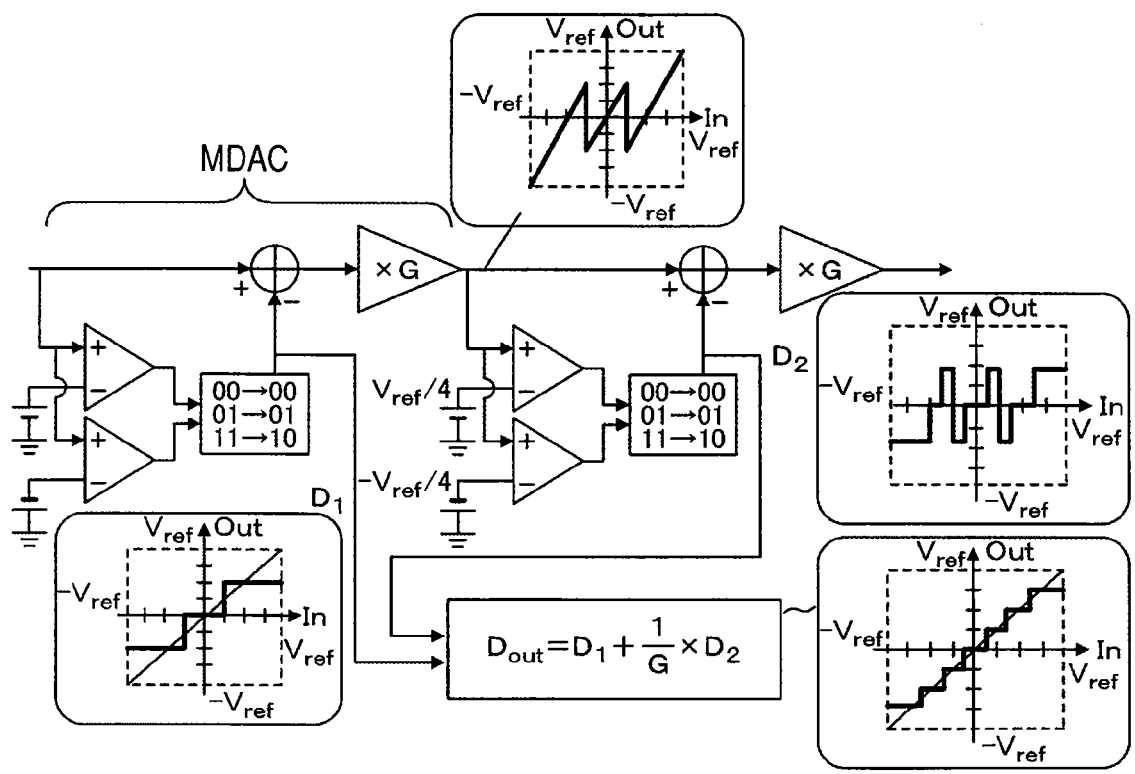
FIG. 2B is a view showing exemplary structure and function of an analog-to-digital converter according to the first embodiment of the present invention.

The analog-to-digital converter 104 and the digital calibration unit 105 will be described referring to FIGS. 2B to 2D.

In the embodiment, a pipelined ADC suitable for realizing the high sample rate and high resolution is selected as the analog-to-digital converter 104. Fundamental operations of the pipelined ADC will be described referring to FIG. 2B.

In the pipelined ADC, N units of MDAC (Multiplying Digital to Analog Converter) are connected in series for N-bit quantization. The MDAC includes a 1.5 b sub ADC formed of two comparators each having a threshold value with respect to ±Vref/4 (Vref: reference voltage), a subtractor, and a double amplification unit (ideally, G=2). As for the first MDAC, the ADC input voltage is quantized to a ternary, and as for the subsequent MDAC, the voltage value passed from the previous MDAC is quantized to a ternary. The resultant quantized error is obtained by the subtractor, and is further amplified to the full scale voltage value of the subsequent MDAC by the double amplifier such that the subsequent process is performed. The resolution may be intensified by 1 b at every passage through the respective MDACs.

The MDAC is formed by a switched capacitor circuit, and performs subtraction and double amplification through combination of the sample mode and the amplification mode. Assuming that the open loop gain of the op-amp is set to A (Vout), and the output of the 1.5 b sub ADC is set to Di (=−1, 0, 1), the input/output relationship of the MDAC may be expressed by the following equation (1).

$$V_{out} = \frac{V_{in}(C_1 + C_2) - C_2 \cdot V_{ref} \cdot D_i}{C_1 + \frac{C_1 + C_2}{A(V_{out})}} \approx 2 \cdot \left(V_{in} - \frac{1}{2} \cdot V_{ref} \cdot D_i\right) \quad (1)$$

Exemplary structures and operations of the analog-to-digital converter 104 and the digital calibration unit 105 will be described referring to FIGS. 2C and 2D. In the embodiment, the digital background calibration process is employed for the purpose of realizing high sample rate and high resolution ADC while reducing the power consumption. That is, as shown in FIG. 2C, a digital background error correction unit and a sub ADC are provided in addition to the main pipelined ADC. Each resolution of two pairs of ADC is appropriately set to a value as target resolution (N)+(1−2 b).

The main pipelined ADC is formed of 10 units of 1.5 b MDACs, and a 1.5 b ADC as a last stage. Each of 11 units outputs the result of 1.5 b quantization (D1 to D11), respectively. It is sufficient to obtain the small gain A (Vout) of each op-amp of the respective MDACs, for example, approximately 30 dB. As a result, the gain G of the quantized error double amplifier shown in FIG. 2B is decreased from doubled to 1.9 times. The calculation in the digital value reproduction unit is changed to Dout=D1+1/1.9*D2 using the coefficient wi as shown in FIG. 2B to maintain the stringency. In the calibration process, the coefficient wi (i=1 to 11) is searched using LMS (Least Mean Square) algorithm which requires the sub ADC. The sub ADC needs to have ENOB at 12 b. However, as the sample hold circuit (S/H) disposed to the front of the sub ADC samples and holds the input signal at sufficiently lower rate (1/K) than the sample rate fCLK, the low sample rate (fCLK/K) may be used.

Figure 2C:
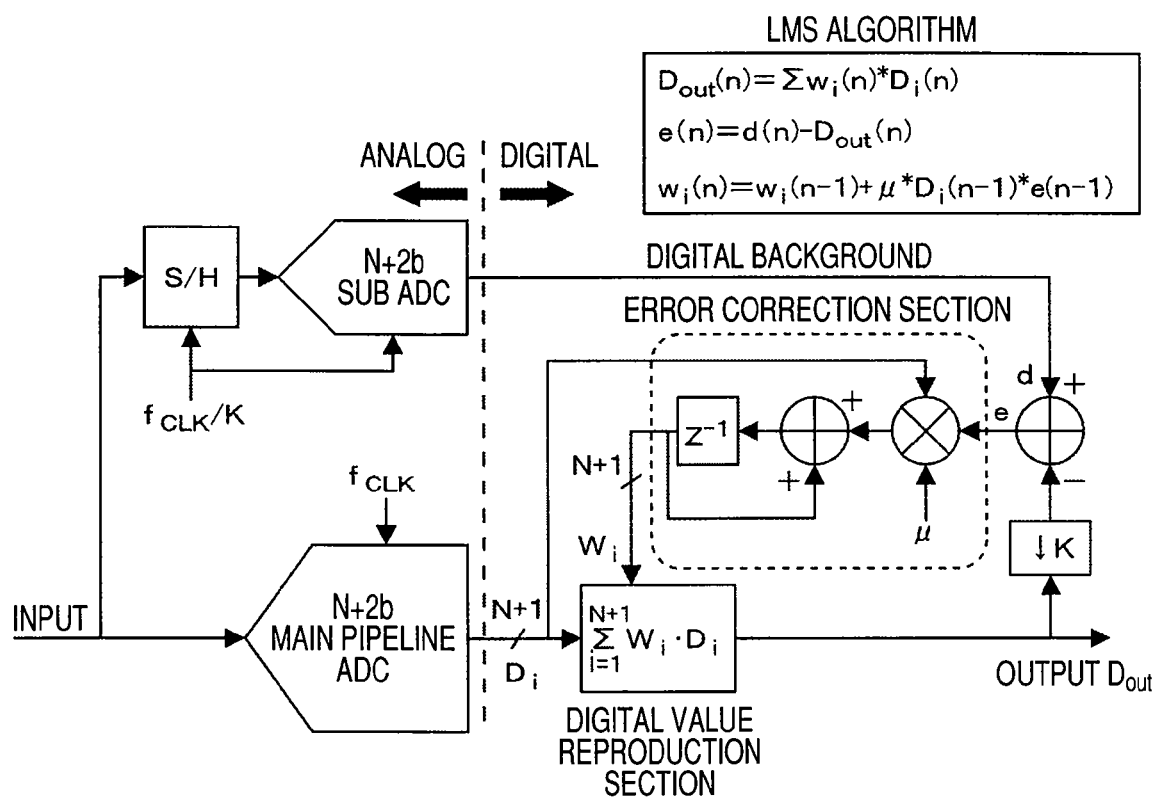
FIG. 2C is a view showing exemplary structure and function of a digital calibration unit according to the first embodiment of the present invention.
Figure 2D:
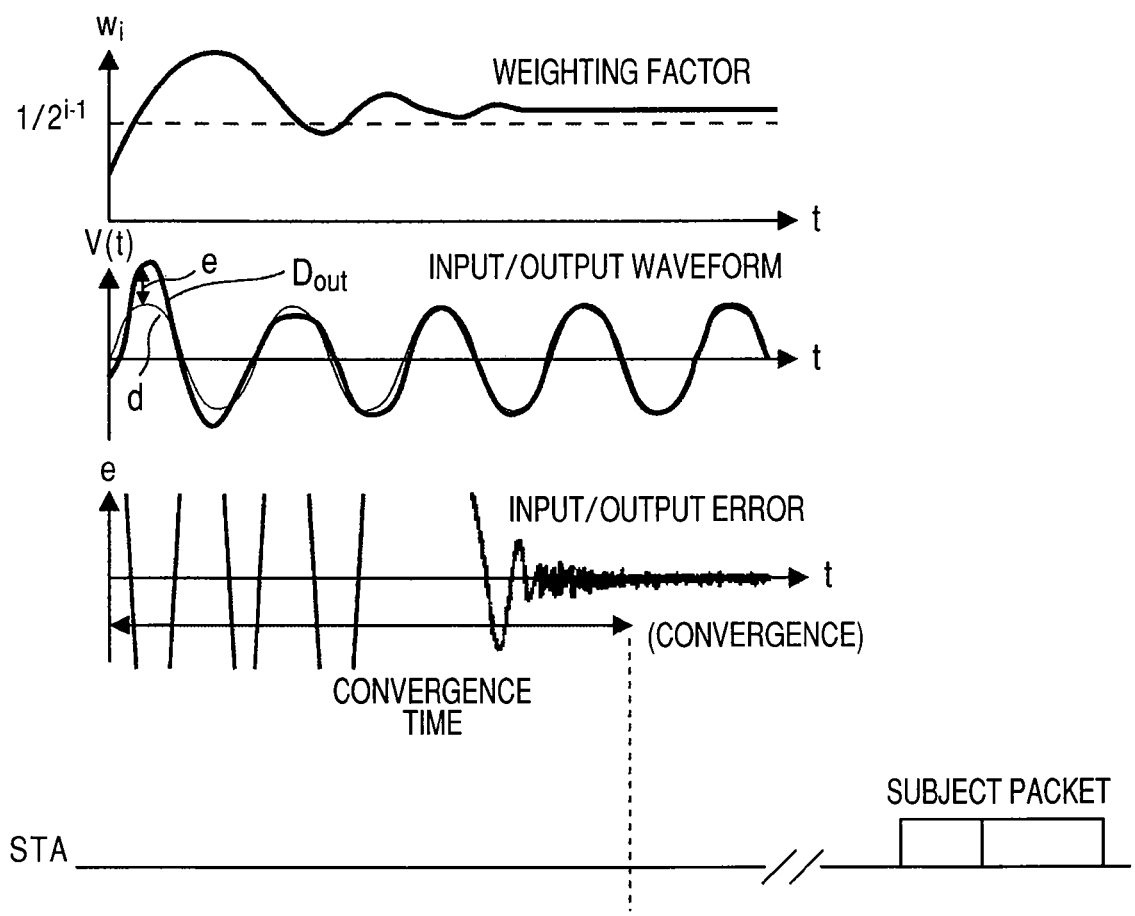
FIG. 2D is an explanatory view of an operation of the digital calibration unit according to the first embodiment of the present invention.

An error e between the output Dout from the digital value reproduction unit and the output d from the sub ADC is calculated, and the calculated result is used to update the coefficient wi of the digital value reproduction unit in accordance with the LMS algorithm shown in the frame at the upper right section of FIG. 2C. As the algorithm is a negative feedback loop, it may be automatically converged into the correct wi value as shown in FIG. 2D. In most of the case, the convergence time is shorter than the time for the terminal station to receive the subject packet.

The calibration may be sequentially performed on the background without interfering with the A/D conversion process of the main ADC, thus following the historical change in the wi value caused by the temperature fluctuation or supply voltage fluctuation.

Figure 2E:
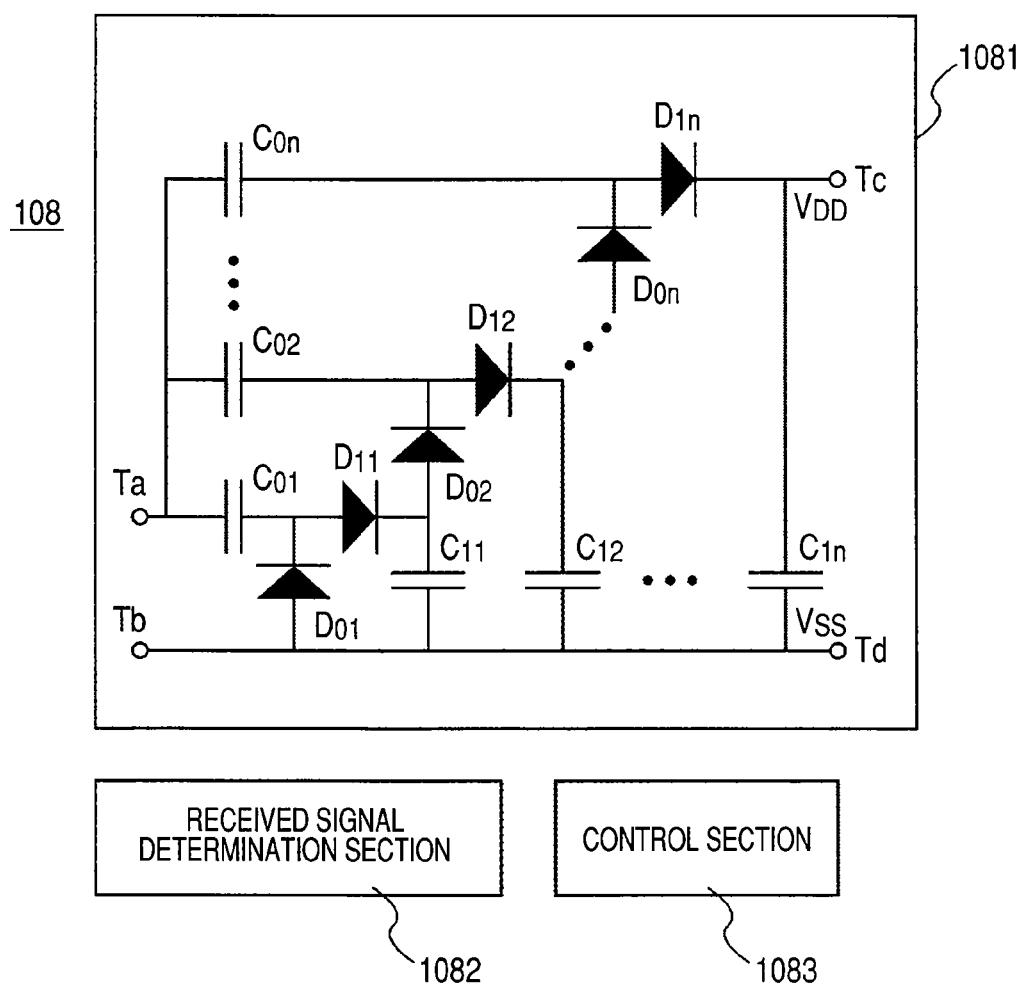
FIG. 2E is a view showing an exemplary structure of a signal monitor unit according to the first embodiment of the present invention.

A rectifier circuit employed for the RF tag may be used as the circuit for forming the signal monitor unit 108. FIG. 2E shows an exemplary structure of the signal monitor unit 108. The signal monitor unit 108 includes a rectifier circuit 1081, a reception signal determination section 1082 connected to an output side thereof, and a control section 1083. It exhibits an amplitude wave detection function for converting an ac input signal into is a dc voltage, a function for determining presence/absence of the reception signal in accordance with the level of the amplitude wave detected dc voltage, and a function for controlling operations of at least one of the analogto-digital converter 104 and the digital calibration unit 105 based on the determination results.

The rectifier circuit 1081 of multi-stage type includes capacitive elements ($C_{01}$-$C_{0n}$, $C_{11}$-$C_{1n}$) and rectifier elements ($D_{01}$-$D_{0n}$) each formed of a field effect transistor, and subjects a high frequency signal, that is, IF signal to AC-DC conversion so as to be output as VDD.

The rectifier circuit shown in FIG. 2E is formed as a half-wave rectifier circuit having the rectifier elements $D_{01}$ and $D_{11}$, $D_{02}$ and $D_{12}$, and $D_{0n}$ and $D_{1n}$ at the respective stages connected in series. Capacitors $C_{01}$, $C_{02}$, $C_{0n}$ are connected between an input terminal Ta and the rectifier elements $D_{11}$, $D_{12}$, $D_{1n}$ at the respective stages. Output sides of the rectifier elements $D_{11}$, $D_{12}$, $D_{1n}$ at the respective stages are connected to the capacitors $C_{11}$, $C_{12}$, $C_{1n}$, respectively. An input terminal Tb and an output terminal Td may be commonly used.

The first rectifier element $D_{01}$ applies electric current when the voltage of the input terminal Ta is lower than that of the input terminal Tb to charge the capacitor $C_{01}$. The rectifier element $D_{11}$ applies the electric current when the voltage of the input terminal Ta is higher than the threshold voltage of the rectifier element to charge the voltage charged in the capacitor $C_{01}$ to the capacitor $C_{11}$. Likewise, the dc voltage VDD may be output between the output terminals Tc and Td based on the high frequency signal of the intermediate frequency input between the input terminals Ta and Tb.

The reception signal determination section 1082 determines with respect to presence/absence of the reception signal based on the level of the dc voltage output from the rectifier circuit 1081. Based on the determination results, the control section 1083 is operated. That is, the control section 1083 of the signal monitor unit 108 brings the analog-to-digital converter, the calibration unit and at least a part of the other circuits into a sleep mode in each of the respective terminal stations in the single wireless system in the period except the data reception and the analog-to-digital converter calibration. In the aforementioned state, the presence of the signal transmitted/received within the wireless system is detected to activate the respective circuits in the sleep mode for transition to the normal mode. The analog-to-digital converter, thus, may be calibrated.

The signal monitor unit 108 generates the dc voltage VDD as power supply using not only the packet signal addressed to the subject station but also all the reception signals in the wireless system for supplying power to the analog-to-digital converter 104 and the digital calibration unit 105 in accordance with the state of the reception signal.

The variable band bandpass filter may be disposed to the front of the rectifier circuit for adding the frequency detection function to the signal monitor unit.

Structure and effect of the wireless system using the terminal station provided with the wireless receiver circuit according to the embodiment will be described referring to FIGS. 3A and 3B.

Figure 3A:
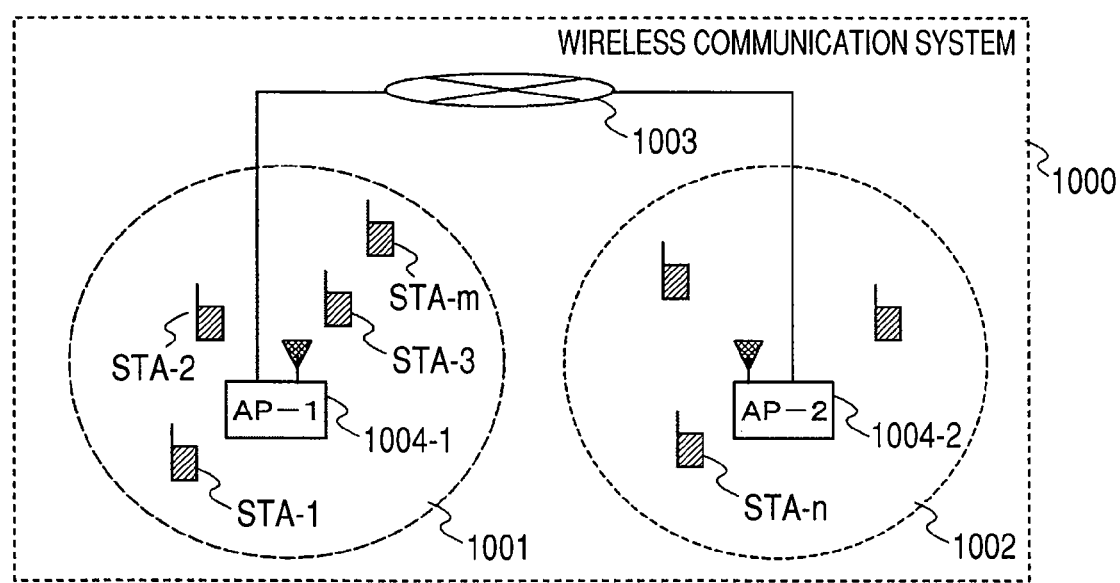
FIG. 3A is a view showing an exemplary structure of a wireless system having the wireless receiver circuit according to the first embodiment of the present invention employed for a terminal station.

Referring to FIG. 3A, a wireless LAN system 1000 includes a wireless system 1001 formed of a base station 1004-1 and a plurality of terminal stations (STA-1 to STA-m), another wireless system 1002 with similar structure, and a wired network 1003 for connecting those systems. The wireless system is formed as CSMA/CA (Carrier Sense Multiple Access with Collision Avoidance) system. The terminal station includes a wireless receiver circuit according to the embodiment. In the receiver circuit of the terminal station (STA-1 to STA-m) corresponding to the wireless system 1001, the signal in the common specific frequency band passes the bandpass filter so as to be output from the output side of the high frequency circuit 101. In the receiver circuit of the terminal station (STAn) corresponding to the wireless system 1002, the signal in the other common specific frequency band passes the bandpass filter so as to be output as an IF signal from the output side of the high frequency circuit 101. Alternatively, the frequency band common to the wireless systems 1001 and 1002 may be used.

In the generally employed wireless system, the signal is received in the unit of packet. Referring to FIG. 3B, in the CSMA/CA system, the beacon signal is periodically broadcasted from the base station, and the polling signal is transmitted from the base station to the terminal station prior to transmission/reception of the subject packet signal. In the mode except the power save mode, the terminal station constantly monitors (carrier senses) the presence of the packet signal output from the other terminal station.

In the embodiment, the digital calibration unit 105 of the subject terminal station is allowed to proceed digital calibration of the analog-to-digital converter 104 using the respective signals, that is, the beacon signal, the polling signal, the carrier sense signal, or at least a part of the transmission/reception signals of the subject packet in the other user (terminal station).

At least a part of the circuits is brought into a sleep mode in the period except data reception and calibration of the analog-to-digital converter 104. When the signal monitor unit 108 detects the wireless signal, the circuit in the sleep mode is activated so as to receive the data or calibrate the analog-to-digital converter 104 for reducing the power consumption. In the terminal station 2, for example, the signal monitor unit 108 controls the power supply ADC-Vdd of the analog-to-digital converter 104, and the power supply CAL-Vdd of the digital calibration unit 105 to be turned ON upon detection of not only the subject packet signal addressed to the subject station (STA2) but also the wireless signal except the subject packet signal addressed to the subject station (STA2).

The signal input to the analog-to-digital converter 104 is amplified by the variable gain amplifier 103 and the automatic gain control unit 107 to a full scale range of the analog-to-digital converter or the level close thereto such that the calibration is normally performed.

Referring to FIG. 3B, the beacon signal and the polling signal from the base station are used to perform digital calibration of the analog-to-digital converter of the terminal station 1. The digital calibration may be converged before the base station 1 receives the subject packet signal, or before at least end of the preamble period upon reception of the subject packet signal. Assuming that the preamble period is set to approximately 48 □S, the digital calibration may be converged before reception of the subject packet signal. The terminal station 2 uses the beacon signal, the polling signal, the carrier sense signal and all the transmission/reception signals of the subject packet of the terminal station 1 to perform the digital calibration of the analog-to-digital converter. The terminal station 2 is allowed to converge the digital calibration before reception of the subject packet signal.

The signal input to the analog-to-digital converter 104 has to be oscillated sufficient to reach approximate to the full-scale level of the analog-to-digital converter 104 for effectively performing the digital calibration. Generally the period equal to or longer than the preamble period as the stand-by period for data reception is required for the purpose of converging the digital calibration unit 105 even if the signal sufficiently near the full-scale level is input to the analog-to-digital converter 104. In the embodiment, the digital calibration unit 105 uses at least a part of the respective signals to perform digital calibration of the analog-to-digital converter 104 such that the digital calibration unit 105 is converged before reception of the subject packet signal or at least the end of the preamble period upon reception of the subject packet signal. In the single wireless system 1001, plural terminal stations are mostly in operable states. The use of the subject packet signal addressed to the activated terminal stations, or the transmission/reception signal to/from the base station allows the digital calibration to be converged at an earlier stage.

Each of the terminal stations in the wireless system is structured to perform digital calibration using not only the subject packet signal addressed to the subject station, which is transmitted and received in the wireless system but also all the reception signals therein so as to converge the calibration of the digital calibration type analog-to-digital converter with high resolution at high sample rate suitable for the wireless system for the next generation before end of the preamble period of the subject packet signal required to be received.

At least a part of the circuits is brought into the sleep mode to allow the signal monitor unit to detect the other signal in the period except data reception and calibration of the analog-to-digital converter. The circuits in the sleep mode are activated to calibrate the analog-to-digital converter for reducing the power consumption of the terminal station.

Second Embodiment

A second embodiment of the present invention will be described referring to FIGS. 4A and 4B.

FIG. 4A is a block diagram of a wireless receiver circuit according to the second embodiment of the present invention. The wireless receiver circuit according to the second embodiment includes a high frequency circuit 201, a low frequency circuit (a filter 202, a variable gain amplifier 203 and an automatic gain control unit 207) connected to an output side of the high frequency circuit, an analog-to-digital converter 204 connected to an output side of the low frequency circuit, a digital calibration unit 205 for calibration to improve the effective resolution of the analog-to-digital converter, a digital signal processing unit 206 formed of a digital signal processor and the like, a signal monitor unit 208 for detecting the reception signal, and a filter control unit 209. The filter control unit 209 has a control function to allow the signal to pass the passage band of the filter contained in the low frequency circuit (or high frequency circuit). The embodiment has the same structure as that of the first embodiment except the filter control unit 209 and the related components.

A signal input from the antenna is amplified in the high frequency circuit 201, and subjected to the frequency conversion into a lower intermediate frequency (or zero frequency). The intermediate frequency signal has its interfering wave component eliminated by the filter 202, and is amplified in the variable gain amplifier 203 so as to be input to the analog-to-digital converter 204. The output of the analog-to-digital converter 204 is input to the digital calibration unit 205, and the conversion error contained in the output of the analog-to-digital converter 204 is calibrated and output. The automatic gain control unit 207 automatically determines the gain of the variable gain amplifier 203 such that the output of the amplifier becomes equal to or slightly smaller than the input dynamic range of the analog-to-digital converter 204.

The digital signal calibrated in the digital calibration unit 205 is subjected to the required processing, for example, filtering, demodulation, and higher layer processing in the digital signal processing unit 206. The analog-to-digital converter 204 realizes the low power consumption by reducing the power consumption of the op-amp of the inner circuit, and allows the digital calibration unit 205 to calibrate the resultant conversion error to realize the analog-to-digital converter with high resolution at the high sample rate while keeping the low power consumption.

The output side of the high frequency circuit 201 is connected to the signal monitor unit 208 for determining with respect to presence/absence or type of the signal. Based on the determination result of the signal monitor unit 208, operations of the analog-to-digital converter 204 and the digital calibration unit 205 are controlled. Under the control, the supply voltage may be controlled, or at least a part of operations may be stopped. However, the present invention is not limited to the aforementioned control.

For example, the terminal station 2 is controlled to turn the power supply ADC-Vdd of the analog-to-digital converter 204 and the power supply CAL-Vdd of the digital calibration unit 205 ON when the signal monitor unit 208 detects the subject packet signal addressed to the subject station and the wireless signals except the packet signal addressed thereto.

In the embodiment, an output signal of the signal monitor unit 208 is input to the filter control unit 209. The signal monitor unit 208 may have a frequency determination function to obtain the frequency of the incoming signal, and information of which is input to the filter control unit 209 for controlling the passage band of the filter 202 such that the frequency of the incoming signal is within the thus controlled passage band.

Assuming that the passage band frequency of the filter 202 is set to fc, the selectable passage band frequencies are set to f1 and f2, and the terminal station 2 is set to the subject station (passage band frequency=f2), the control is executed such that the passage band frequency is set to f1 upon transmission of the subject packet signal addressed to the station other than the subject station, for example, the terminal station 1, and the passage band frequency is set to f2 upon the transmission of the subject packet signal addressed to the subject station. In the aforementioned case, a sufficiently large signal may be transmitted to the input side of the analog-to-digital converter 204 irrespective of the frequency of the incoming signal, that is, in spite of the unnecessary wave or interfering wave to the subject station. This makes it possible to proceed convergence of the calibration.

The embodiment allows calibration of the digital calibration type analog-to-digital converter with high resolution at high sample rate suitable for the wireless system for the next generation before end of the preamble period of the subject packet signal required to be received. This makes it possible to reduce the power consumption of the wireless transceiver.

Third Embodiment

Figure 5:
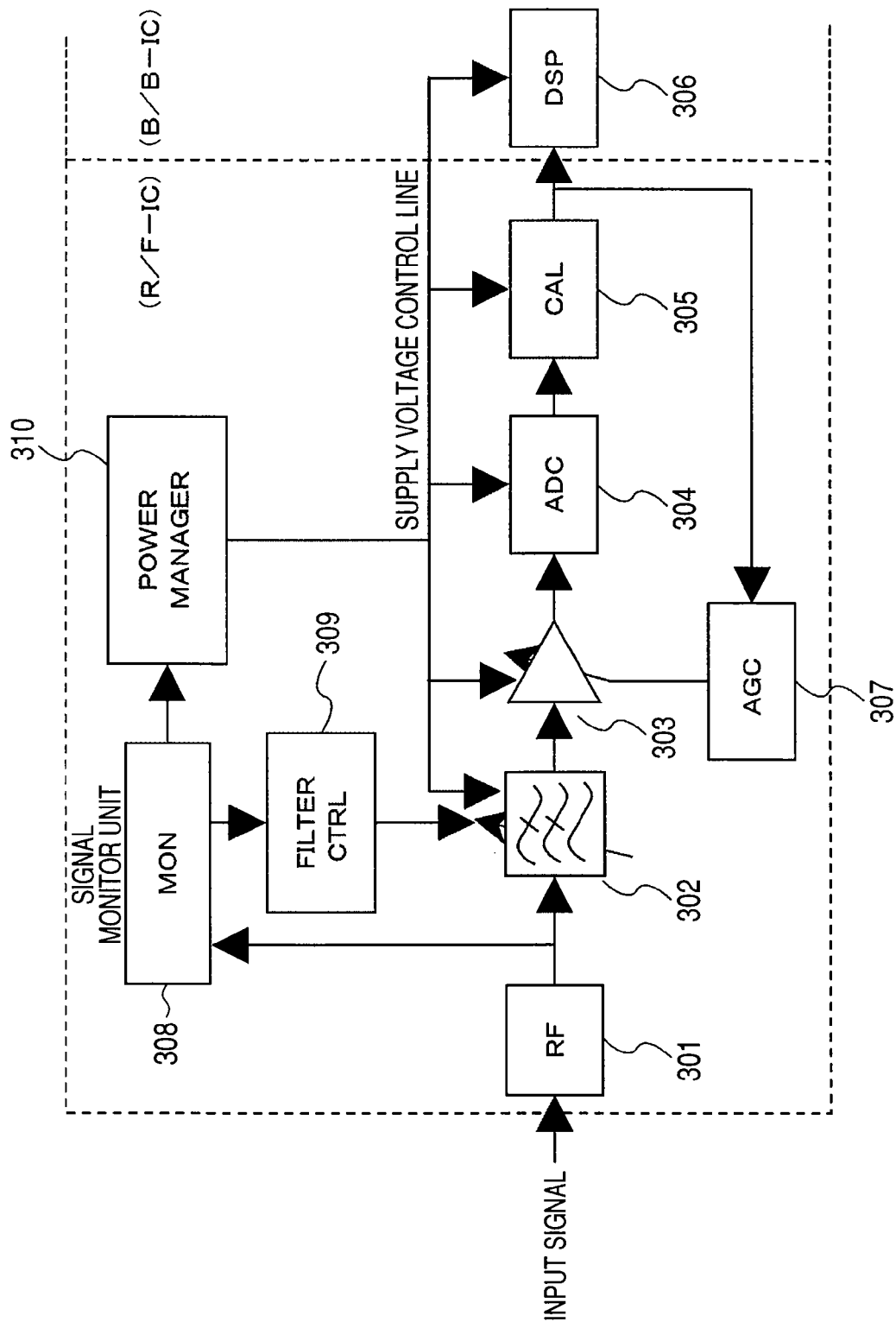
FIG. 5 is a block diagram of a wireless receiver circuit according to a third embodiment of the present invention.

FIG. 5 is a block diagram of a wireless receiver circuit according to a third embodiment of the present invention. The wireless receiver circuit of the embodiment includes a high frequency circuit 301, a low frequency circuit (a filter 302, a variable gain amplifier 303, and an automatic gain control unit 307) connected to an output side of the high frequency circuit, an analog-to-digital converter 304 connected to an output side of the low frequency circuit, a digital calibration unit 305 for performing calibration to improve the effective resolution of the analog-to-digital converter, a digital signal processing unit 306 formed of a digital signal processor and the like, a signal monitor unit 308 for detecting the reception signal, a filter control unit 309, and a power supply management unit 310. The embodiment has the same structure as that of the second embodiment except the power supply management unit 310 and the related components.

A signal input from the antenna is amplified in the high frequency circuit 301, and is subjected to the frequency conversion into the lower intermediate frequency (or zero frequency). The intermediate frequency signal has its interfering wave component eliminated by the filter 302, and is amplified in the variable gain amplifier 303 so as to be input to the analog-to-digital converter 304. An output of the analog-to-digital converter 304 is input to the digital calibration unit 305, and the conversion error contained in the output of the analog-to-digital converter 304 is calibrated and output. The automatic gain control unit 307 automatically determines the gain of the variable gain amplifier 303 such that the output of the amplifier becomes equal to or slightly smaller than the input dynamic range of the analog-to-digital converter 304 based on the output level of the digital calibration unit 305. The digital signal calibrated in the digital calibration unit 305 is subjected to the required process, for example, filtering, demodulating, and higher layer processing by the digital signal processing unit 306. The analog-to-digital converter 304 reduces the power consumption of the op-amp of the inner circuit to realize the low power consumption. The resultant conversion error is calibrated by the digital calibration unit 305 to provide the analog-to-digital converter with high resolution at high sample rate while keeping the low power consumption.

The signal monitor unit 308 is connected to the output side of the high frequency circuit 301 such that the determination is made with respect to presence/absence or type of the signal. The power supply management unit 310 connected to the output side of the signal monitor unit 308 controls supply voltage of at least a part of the filter 302, the variable gain amplifier 303, the analog-to-digital converter 304, the digital calibration unit 305, and the digital signal processing unit 306 based on the determination results made by the signal monitor unit 308 with respect to the presence/absence of the signal and the type thereof for reducing the power consumption.

When the signal monitor unit 308 determines the presence of the signal (including the interfering wave), the power supplies of all the circuits except the digital signal processing unit 306 are turned ON to allow the digital calibration unit 305 to perform calibration of the analog-to-digital converter 304. When the signal monitor unit 308 determines that the required wave signal is present by using the frequency determination function, power supplies of all the circuits including the digital signal processing unit 306 are turned ON to receive data. The aforementioned case has been explained as a mere example, and the present invention is not limited to the exemplary case.

The signal output from the signal monitor unit 308 is input to the filter control unit 309. The signal monitor unit 308 is capable of obtaining the frequency of the incoming signal by its frequency determination function. The information with respect to the frequency is input to the filter control unit 309 to control the passage band of the filter 302 such that the frequency of the incoming signal is within the controlled passage band of the filter 302.

In the embodiment, each of the respective terminal stations in the wireless system is structured to perform digital calibration of the subject station using not only the subject packet signal addressed to the subject station transmitted/received in the subject wireless system but also all the reception signals in the wireless system. The thus structured terminal station allows a sufficiently large signal to be transmitted to the input side of the analog-to-digital converter 304 irrespective of the presence of the unnecessary wave or interfering wave to the subject terminal station. This makes it possible to proceed convergence of the calibration.

The embodiment allows the digital calibration type analog-to-digital converter with high resolution at high sample rate suitable for the wireless system for the next generation to be calibrated before end of the preamble period of the subject packet signal required to be received. This also makes it possible to reduce power consumption of the wireless transceiver.

Fourth Embodiment

A fourth embodiment will be described referring to FIGS. 6A and 6B.

Figure 6A:
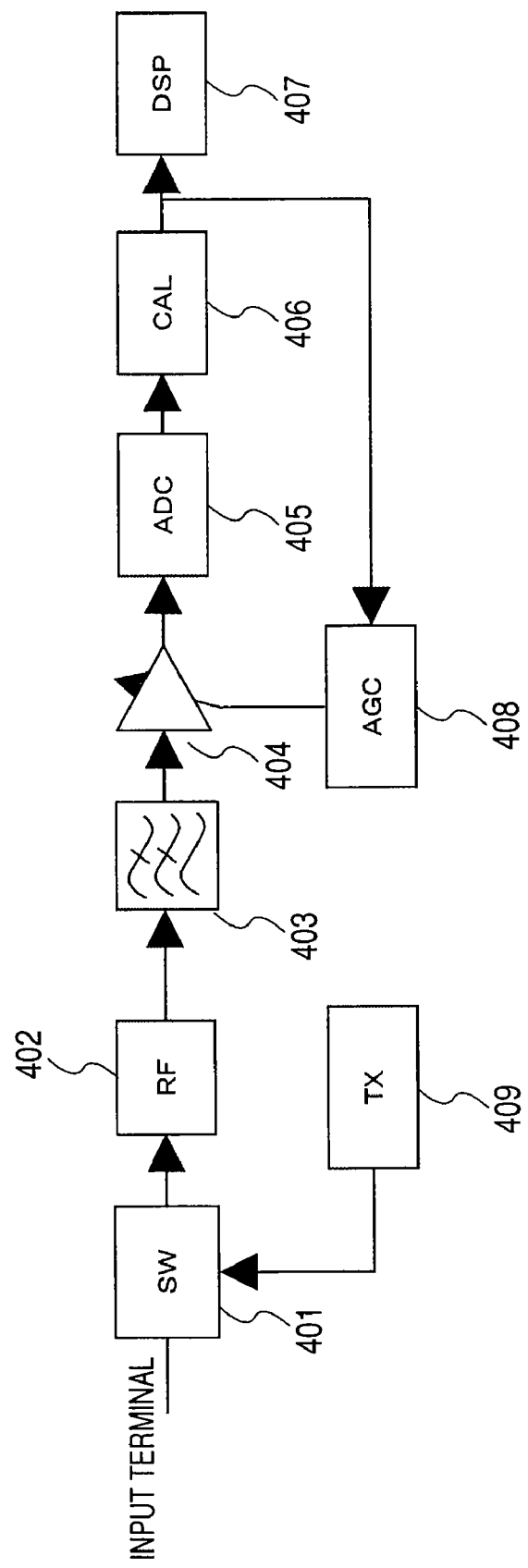
FIG. 6A is a block diagram of a wireless transceiver according to a fourth embodiment of the present invention.

FIG. 6A is a block diagram of a wireless transceiver according to the embodiment. The wireless transceiver includes a wireless receiver circuit connected to a transmission/reception switching unit 401, and a wireless transceiver circuit 409. The wireless receiver circuit includes a high frequency circuit 402, a low frequency circuit (a filter 403, a variable gain amplifier 404, and an automatic gain control unit 408) connected to an output side of the high frequency circuit, an analog-to-digital converter 405 connected to an output side of the low frequency circuit, a digital calibration unit 406 for calibration to improve the effective resolution of the analog-to-digital converter, and a digital signal processing unit 407 formed of a digital signal processor. Structures of the low frequency circuit, the analog-to-digital converter and the digital calibration unit are the same as those of the first embodiment.

A reception signal input from the antenna passes the transmission/reception switching unit 401, and is amplified in the high frequency circuit 402. It is then subjected to the frequency conversion into the lower intermediate frequency (or zero frequency). The intermediate frequency signal has its interfering wave component eliminated by the filter 403, and is amplified in the variable gain amplifier 404 so as to be input to the analog-to-digital converter 405. The signal output from the analog-to-digital converter 405 is input to the digital calibration unit 406, which calibrates the conversion error contained in the output signal of the analog-to-digital converter 405 so as to be output. The automatic gain control unit 408 automatically determines the gain of the variable gain amplifier 404 such that the output of the amplifier becomes equal to or slightly smaller than the input dynamic range of the analog-to-digital converter 405. The digital signal calibrated in the digital calibration unit 406 is subjected to the required process, for example, filtering, demodulating, and higher layer processing by the digital signal processing unit 407. The analog-to-digital converter 405 reduces the power consumption of the op-amp of the inner circuit to realize the low power consumption. The resultant conversion error is calibrated by the digital calibration unit 406 to provide the analog-to-digital converter with high resolution at high sample rate while keeping the low power consumption.

In the embodiment, the terminal station controls the power supply ADC-Vdd of the analog-to-digital converter 405 and the power supply CAL-Vdd of the digital calibration unit 406 to be turned ON upon transmission of the transmission packet signal so as to use the transmission signal TX as the power supply as shown in FIG. 6B. That is, the digital calibration unit 406 is allowed to proceed calibration of the analog-to-digital converter 405 using the signal applied from the wireless transceiver circuit 409 connected to the transmission/reception switching unit 401 upon transmission of the transmission packet signal to the receiver side via the transmission/reception switching unit 401.

The signal is applied from the transceiver side to the receiver side naturally in the form of leakage of the transmission signal from the transceiver side to the receiver side as a result of limitation in isolation between the transmission/reception paths of the transmission/reception switching unit 401. However, the amount of the signal applied from the transceiver side to the receiver side may be adjusted by intentionally setting the feature of the transmission/reception switching unit 401.

The embodiment allows calibration of the digital calibration type analog-to-digital converter with high resolution at high sample rate suitable for the wireless system for the next generation before end of the preamble period of the subject packet signal required to be received. This also makes it possible to reduce power consumption of the wireless transceiver.

Fifth Embodiment

A fifth embodiment of the present invention will be described referring to FIG. 7.

Figure 7:
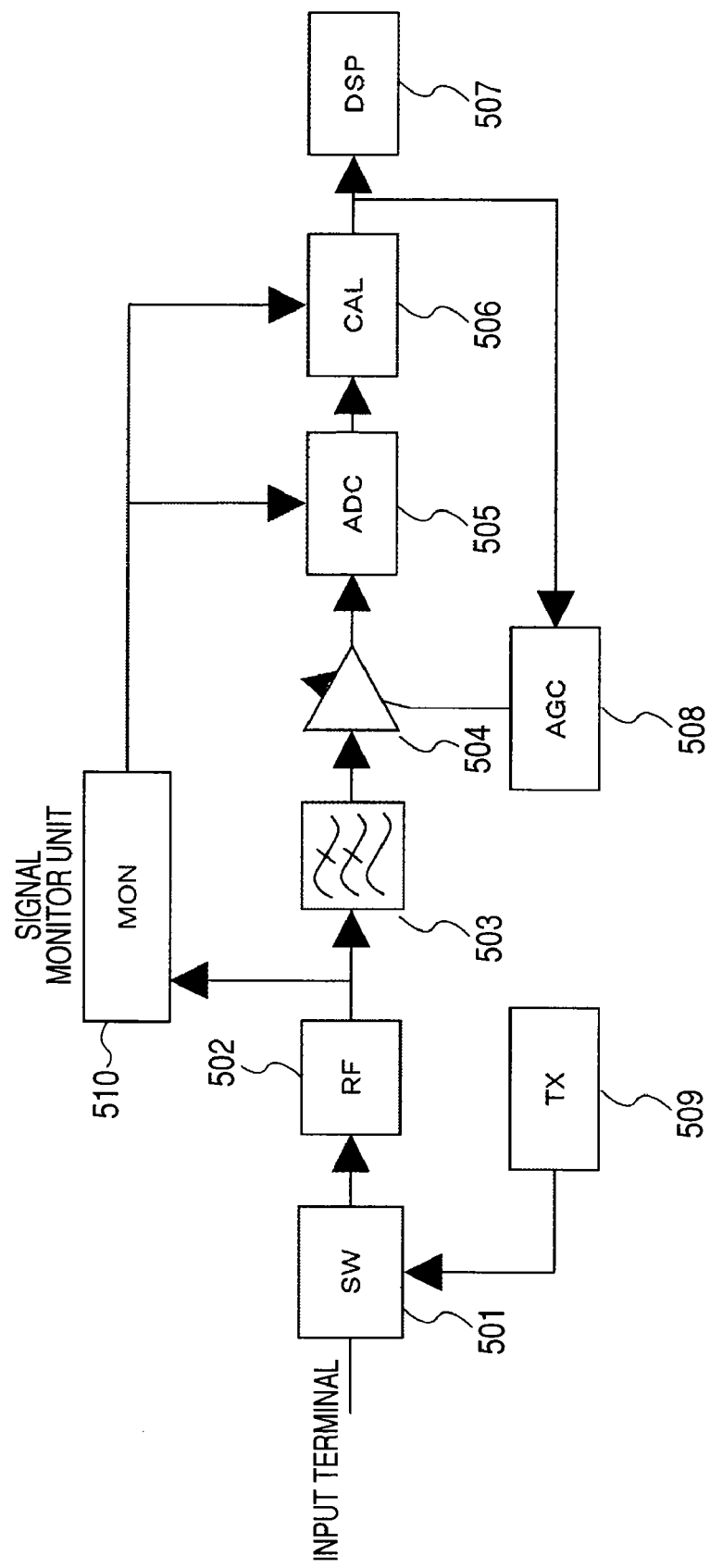
FIG. 7 is a block diagram of a wireless transceiver according to a fifth embodiment of the present invention.

FIG. 7 is a block diagram of a wireless transceiver according to the embodiment. The wireless transceiver includes a wireless receiver circuit connected to a transmission/reception switching unit 501 and a wireless transceiver circuit 509. The wireless receiver circuit includes a high frequency circuit 502, a low frequency circuit (a filter 503, a variable gain amplifier 504, and an automatic gain control unit 508) connected to an output side of the high frequency circuit, an analog-to-digital converter 505 connected to an output side of the low frequency circuit, a digital calibration unit 506 for calibration to improve the effective resolution of the analog-to-digital converter, a digital signal processing unit 507 formed of a digital signal processor, and a signal monitor unit 510. Structures of the low frequency circuit, the analog-to-digital converter, and the digital calibration unit are the same as those of the first embodiment.

A signal input from the antenna passes the transmission/reception switching unit 501, and amplified in the high frequency circuit 502. It is subjected to the frequency conversion into a lower intermediate frequency (or zero frequency). The intermediate frequency signal has its interfering wave component eliminated by the filter 503, and is amplified in the variable gain amplifier 504 so as to be input to the analog-to-digital converter 505. A signal output from the analog-to-digital converter 505 is input to the digital calibration unit 506, and the conversion error contained in the output of the analog-to-digital converter 505 is calibrated and output. The automatic gain control unit 508 automatically determines the gain of the variable gain amplifier 504 such that the output of the amplifier becomes equal to or slightly smaller than the input dynamic range of the analog-to-digital converter 505. The digital signal calibrated in the digital calibration unit 506 is subjected to the required process, for example, filtering, demodulating, and higher layer processing by the digital signal processing unit 507. The analog-to-digital converter 505 reduces the power consumption of the op-amp of the inner circuit to realize the low power consumption. The resultant conversion error is calibrated in the digital calibration unit 506 to provide the analog-to-digital converter with high resolution at high sample rate while keeping the low power consumption.

The digital calibration unit 506 is allowed to proceed calibration of the analog-to-digital converter 505 using the signal applied from the wireless transceiver circuit 509 connected to the transmission/reception switching unit 501 to the receiver side via the transmission/reception switching unit 501 upon signal transmission. The signal is naturally applied from the transceiver side to the receiver side in the form of leakage of the transmission signal from the transceiver side to the receiver side as a result of limitation in isolation between the transmission/reception paths of the transmission/reception switching unit 501. The feature of the transmission/reception switching unit 501 may be intentionally set to adjust the amount of the signal applied from the transceiver side to the receiver side.

In the embodiment, the signal monitor unit 510 is connected to the output side of the high frequency circuit 502 so as to determine with respect to presence/absence or type of the signal. Operations of the analog-to-digital converter 505 and the digital calibration unit 506 may be controlled based on the result determined by the signal monitor unit 510. Specifically, under the control, the supply voltage may be controlled, or at least a part of operations may be stopped for reducing the power consumption. However, the control operation is not limited to the one as described above. In the embodiment, the digital calibration of the subject station is performed using not only the transmission signal of its own but also all the reception signals in the wireless system likewise the embodiments as described above.

The embodiment allows the digital calibration type analog-to-digital converter with high resolution at high sample rate suitable for the wireless system for the next generation to be calibrated before end of the preamble period of the subject packet signal required to be received. This also makes it possible to reduce power consumption of the wireless transceiver.

Sixth Embodiment

A sixth embodiment of the present invention will be described referring to FIG. 8.

Figure 8:
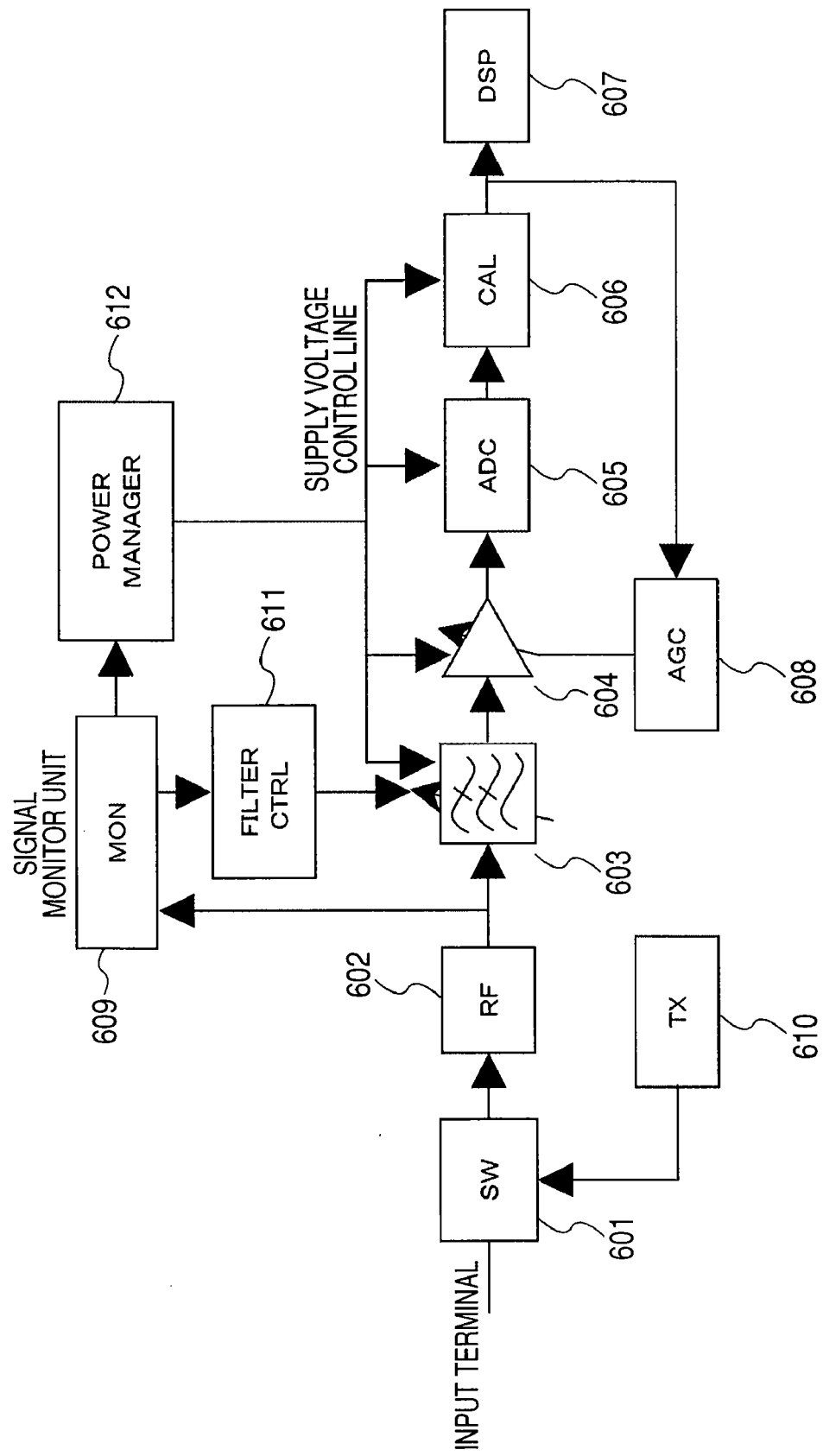
FIG. 8 is a block diagram of a wireless transceiver according to a sixth embodiment of the present invention.

FIG. 8 is a block diagram of a wireless transceiver according to the embodiment. The wireless transceiver includes a wireless receiver circuit connected to a transmission/reception switching unit 601, and a wireless transceiver circuit 610. The wireless receiver circuit includes a high frequency circuit 602, a low frequency circuit (a filter 603, a variable gain amplifier 604, and an automatic gain control unit 608) connected to an output side of the high frequency circuit, an analog-to-digital converter 605 connected to an output side of the low frequency circuit, a digital calibration unit 606 for calibration to improve the effective resolution of the analog-to-digital converter, a digital signal processing unit 607 formed of a digital signal processor, a signal monitor unit 609, a filter control unit 611, and a power supply management unit 612. Structures of the low frequency circuit, the analog-to-digital converter, and the digital calibration unit are the same as those of the first embodiment.

A signal input from the antenna passes the transmission/reception switching unit 601, and is amplified in the high frequency circuit 602. It is subjected to the frequency conversion into the lower intermediate frequency (or zero frequency). The intermediate frequency signal has its interfering wave component eliminated by the filter 603, and is amplified in the variable gain amplifier 604 so as to be input to the analog-to-digital converter 605. A signal output from the analog-to-digital converter 605 is input to the digital calibration unit 606, and the conversion error contained in the output of the analog-to-digital converter 605 is calibrated and output. The automatic gain control unit 608 automatically determines the gain of the variable gain amplifier 604 such that the output of the amplifier becomes equal to or slightly smaller than the input dynamic range of the analog-to-digital converter 605. The digital signal calibrated in the digital calibration unit 606 is subjected to the required process, for example, filtering, demodulating, and higher layer processing by the digital signal processing unit 607. The analog-to-digital converter 605 reduces the power consumption of the op-amp of the inner circuit to realize the low power consumption. The resultant conversion error is calibrated by the digital calibration unit 606 to provide the analog-to-digital converter with high resolution at high sample rate while keeping the low power consumption.

In the embodiment, the digital calibration unit 606 is allowed to proceed calibration of the analog-to-digital converter 605 using the signal applied from the wireless transceiver circuit 609 connected to the transmission/reception switching unit 601 to the receiver side via the transmission/reception switching unit 601. The signal is naturally applied from the transceiver side to the receiver side in the form of leakage of the transmission signal from the transceiver side to the receiver side as a result of limitation in isolation between the transmission/reception paths of the transmission/reception switching unit 601. However, the amount of the signal applied from the transceiver side to the receiver side may be adjusted by intentionally setting the feature of the transmission/reception switching unit 601.

In the embodiment, the signal monitor unit 610 is connected to the output side of the high frequency circuit 602 so as to determine with respect to presence/absence or type of the signal. Operations of the analog-to-digital converter 605 and the digital calibration unit 606 may be controlled based on the result determined by the signal monitor unit 610. Specifically, under the control, the supply voltage may be controlled, or at least a part of operations may be stopped for reducing the power consumption. However, the control operation is not limited to the one as described above.

In the embodiment, an output signal of the signal monitor unit 609 is input to the filter control unit 611. The signal monitor unit 609 may be provided with the frequency determination function to obtain the frequency of the incoming signal. The information with respect to the obtained frequency may be input to the filter control unit 611 to control the passage band of the filter 603 such that the frequency of the incoming signal is within the passage band of the filter 603. The aforementioned structure allows a sufficiently large signal to be transmitted to the input side of the analog-to-digital converter 608 irrespective of the presence of the unnecessary wave or interfering wave to the subject station. This makes it possible to proceed convergence of the calibration.

The embodiment allows the digital calibration type analog-to-digital converter with high resolution at high sample rate suitable for the wireless system for the next generation to be calibrated before end of the preamble period of the subject packet signal required to be received. This also makes it possible to reduce power consumption of the wireless transceiver.

Seventh Embodiment

Figure 9:
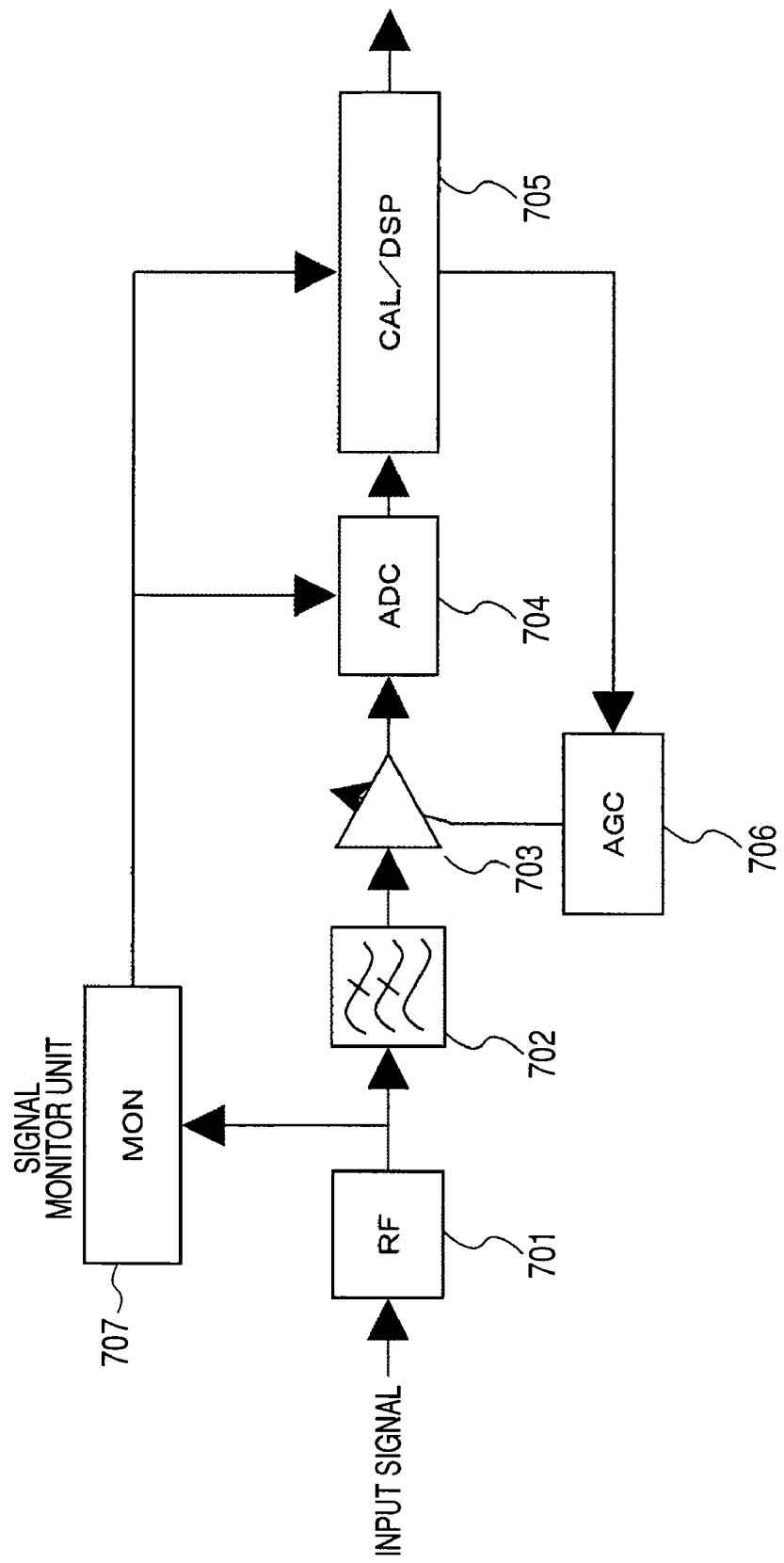
FIG. 9 is a block diagram of a wireless receiver circuit according to a seventh embodiment of the present invention.
Figure 10:
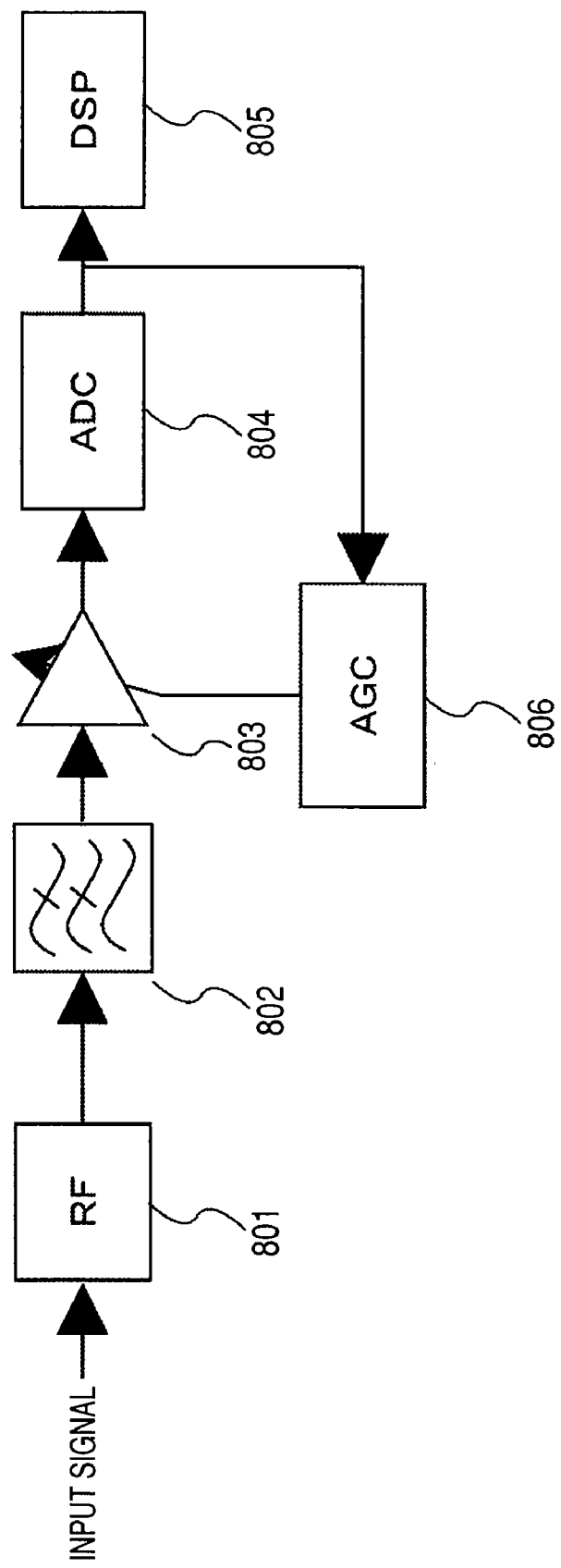
FIG. 10 is a view showing an exemplary structure of a generally employed wireless receiver circuit.
Figure 11:
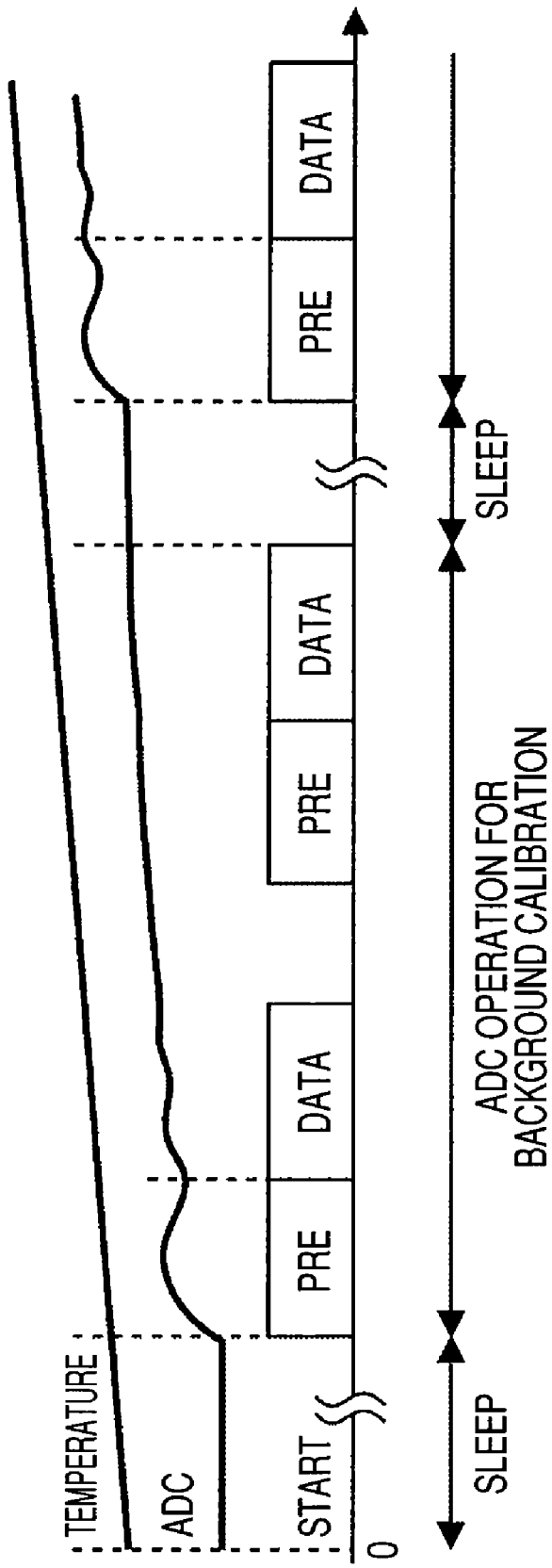
FIG. 11 is an explanatory view of a background of the present invention.

A seventh embodiment of the present invention is shown in FIG. 9 as a block diagram of a wireless receiver circuit according to the embodiment. The wireless receiver circuit includes a high frequency circuit 701, a low frequency circuit (a filter 702, a variable gain amplifier 703, and an automatic gain control unit 706) connected to an output side of the high frequency circuit, an analog-to-digital converter 704 connected to an output side of the low frequency circuit, a digital calibration unit/digital signal processing unit 705, and a signal monitor unit 707. The embodiment has the same structure as that of the first embodiment except the digital calibration unit/digital signal processing unit.

A signal input from the antenna is amplified in the high frequency circuit 701, and subjected to the frequency conversion into the lower intermediate frequency (or zero frequency). The intermediate frequency signal has its interfering wave component eliminated by the filter 702, and is amplified in the variable gain amplifier 703 so as to be input to the analog-to-digital converter 704. A signal output from the analog-to-digital converter 704 is input to the digital calibration unit/digital signal processing unit 705 which calibrates the digital calibration error contained in the output of the analog-to-digital converter 704 so as to be output. The output signal is subjected to the required process, for example, filtering, demodulating, and higher layer processing. The automatic gain control unit 706 automatically determines the gain of the variable gain amplifier 703 such that the output of the amplifier becomes equal to or slightly smaller than the input dynamic range of the analog-to-digital converter 704 based on the level of the calibrated signal derived from the digital calibration unit/digital signal processing unit 705. The analog-to-digital converter 704 reduces the power consumption of the op-amp of the inner circuit to realize the low power consumption. The resultant conversion error is calibrated by the digital calibration unit/digital signal processing unit 705 to provide the analog-to-digital converter with high resolution at high sample rate while keeping the low power consumption.

The signal monitor unit 707 is connected to the output side of the high frequency circuit 701 to determine with respect to presence/absence or type of the signal. Operations of the analog-to-digital converter 704 and the digital calibration unit/digital signal processing unit 705 are controlled based on the determination result of the signal monitor unit 707. Specifically, under the control, the supply voltage may be controlled, or at least a part of operations may be stopped for reducing the power consumption. However, the control operation is not limited to the one as described above.

The embodiment allows the calibration of the output of the analog-to-digital converter 704 with high accuracy using the intensified digital signal processing capability derived from the structure where the digital signal processing unit is mounted on the same chip. The structure further allows the signal monitor unit 707 to easily execute the control operation as described above.

The embodiment allows the digital calibration type analog-to-digital converter with high resolution at high sample rate suitable for wireless system for the next generation to be calibrated before end of the preamble period of the subject packet signal required to be received. This also makes it possible to reduce power consumption of the wireless transceiver.

The respective embodiments of the present invention may be formed into various forms. For example, the structure including the high frequency circuit, the low frequency circuit and the digital signal processing unit may be mounted on the same chip. The aforementioned structure to which the digital calibration unit is added may be mounted on the same chip. The structure to which the analog-to-digital converter is added may be mounted on the same chip. The structure including the stage before the analog-to-digital converter (except the analog-to-digital converter) may be mounted on the same chip.

The wireless receiver circuit including the high frequency circuit, the low frequency circuit, the analog-to-digital converter, the calibration unit, and the signal monitor unit may be integrated on the single chip. The aforementioned circuit to which the digital signal processing unit is added may further be integrated on the single chip. Furthermore, the wireless receiver circuit including the high frequency circuit, the low frequency circuit, the analog-to-digital converter, and the calibration unit, and the transceiver circuit may be integrated on the single chip. Alternatively, the wireless receiver circuit including the high frequency circuit, the low frequency circuit, the analog-to-digital converter, and the calibration unit, the transceiver circuit, and the digital processing unit may further be integrated on the single chip.

What is claimed is:

1. A radio receiver circuit comprising:
a high frequency circuit;
a low frequency circuit connected to an output side of the high frequency circuit;
an analog-to-digital converter connected to an output side of the low frequency circuit;
a calibration unit connected to an output side of the analog-to-digital converter; and
a signal monitor unit to monitor a reception signal received in the high frequency circuit,
wherein the signal monitor unit has a function to monitor a state of a signal transmitted or received in a wireless system and a function to operate the calibration unit before reception of a packet signal addressed to a subject station using the signal.

2. The radio receiver circuit according to claim 1,
wherein the signal monitor unit has a function to allow the calibration unit to calibrate the analog-to-digital converter upon detection of the reception signal including a packet signal addressed to a subject station or to another station, a beacon signal or a polling signal supplied through the wireless system.

3. The radio receiver circuit according to claim 2,
wherein the signal monitor unit has a function to control operations of the analog-to-digital converter, the calibration unit and the other circuits which have been normally in OFF state to be turned ON based on a detection result of the reception signal.

4. The radio receiver circuit according to claim 1,
wherein the signal monitor unit comprises a rectifier circuit, a reception signal determination unit and a control unit connected to an output side of the rectifier circuit, and
wherein the signal monitor unit includes an amplitude wave detection function to convert the reception signal into a dc voltage, a function to determine presence/absence of the reception signal in accordance with a level of the amplitude wave detected dc voltage, and a function to control an operation of at least one of the analog-to-digital converter and the calibration unit based on the determination result.

5. The radio receiver circuit according to claim 1,
wherein the signal monitor unit comprises:
a function to bring the analog-to-digital converter, the calibration unit and some or all of the other circuits into a sleep mode in a period except data reception and calibration of the analog-to-digital converter; and
a function to detect other signals transmitted or received in the wireless system, and activating the circuits in the sleep mode to enable the calibration of the analog-to-digital converter.

6. The radio receiver circuit according to claim 1, further comprising a filter control unit at an output side of the signal monitor unit,
wherein the filter control unit has a function to control the signal to pass a passage band of a filter circuit contained in the low frequency circuit or the high frequency circuit based on a result of the signal detection performed by the signal monitor unit.

7. The radio receiver circuit according to claim 1, further comprising a power supply management unit at an output side of the signal monitor unit,
wherein the power supply management unit has a function to turn some or all of circuits in the radio receiver circuit OFF based on a result of the signal detection performed by the signal monitor unit.

8. The radio receiver circuit according to claim 1,
wherein the high frequency circuit, the low frequency circuit, the analog-to-digital converter, the calibration unit and the signal monitor unit are integrated on one chip.

9. The radio receiver circuit according to claim 1,
wherein the high frequency circuit, the low frequency circuit, the analog-to-digital converter, the calibration unit, the signal monitor unit, and a digital signal processing unit are integrated on one chip.

10. A radio transceiver circuit comprising:
a wireless receiver circuit;
a wireless transceiver circuit; and
a transmission/reception switching unit,
wherein the wireless receiver circuit comprises a high frequency circuit, a low frequency circuit connected to an output side of the high frequency circuit, an analog-to-digital converter connected to an output side of the low frequency circuit, and a calibration unit connected to an output side of the analog-to-digital converter, and
wherein the wireless receiver has a function to operate the analog-to-digital converter and the calibration unit using a signal other than a packet signal addressed a subject station which has been transmitted or received in a wireless system.

11. The radio transceiver circuit according to claim 10,
wherein the signal is applied from the wireless transceiver circuit to a receiver side via the transmission/reception switching unit, and
wherein the signal is transmitted to an input side of the analog-to-digital converter at a sufficient amplitude level to allow the calibration unit to calibrate the analog-to-digital converter.

12. The radio transceiver circuit according to claim 11, further comprising a filter control unit at an output side of the signal monitor unit,
wherein the filter control unit has a function to control a signal to pass a passage band of a filter circuit contained in the low frequency circuit or the high frequency circuit based on a signal detection results of the signal monitor unit.

13. The radio transceiver circuit according to claim 11, further comprising a power supply management unit at an output side of the signal monitor unit,
wherein the power supply management unit has a function to turn a supply voltage of some or all of circuits in a wireless receiver circuit OFF based on a signal detection result of the signal monitor unit.

14. The radio transceiver circuit according to claim 10, further comprising a signal monitor unit to detect a signal applied from the wireless transceiver circuit to a receiver side via the transmission/reception switching unit,
wherein the signal monitor unit has a function to operate the calibration unit before reception of a packet signal addressed to a subject station using the signal.

15. The radio transceiver circuit according to claim 14,
wherein the signal is formed as a packet signal addressed to a subject station, a packet signal addressed to another station, and a beacon signal and a polling signal applied through the wireless system, and wherein the signal monitor unit has a function to calibrate the analog-to-digital converter upon detection of the signal.

16. The radio transceiver circuit according to claim 10, further comprising a signal monitor unit to detect a signal applied from the wireless transceiver circuit to a receiver side via the transmission/reception switching unit, wherein the signal monitor unit has a function to control operations of the analog-to-digital converter and the calibration unit based on a signal detection result of the signal monitor unit.

17. The radio transceiver circuit according to claim 10, wherein a wireless receiver circuit including the high frequency circuit, the low frequency circuit, the analog-to-digital converter, and the calibration unit, and a transceiver circuit are integrated on one chip.

18. The radio transceiver circuit according to claim 10, wherein a wireless receiver circuit including the high frequency circuit, the low frequency circuit, the analog-to-digital converter and the calibration unit, a transceiver circuit, and a digital processing unit are integrated on one chip.

19. A method for calibrating a radio transceiver circuit which is structured to be used in a wireless system, the radio transceiver circuit including a high frequency circuit, a low frequency circuit connected to an output side of the high frequency circuit, an analog-to-digital converter connected to an output side of the low frequency circuit, and a calibration unit connected to an output side of the analog-to-digital converter, a wireless transceiver circuit, and a transmission/reception switching unit, and the method comprising the steps of:

monitoring a state of a signal transmitted or received in the wireless system; and operating the analog-to-digital converter and the calibration unit using a packet signal addressed to a subject station, a packet signal addressed to another station, and a beacon signal and a polling signal supplied in the wireless system.

20. The method for calibrating a radio transceiver circuit according to claim 19, wherein, in other cases than data reception and calibration of the analog-to-digital converter, at least one of the analog-to-digital converter, the calibration unit, and another circuit are brought into a sleep and wherein, in case that a signal transmitted or received in the wireless system is detected, each of the analog-to-digital converter, the calibration unit, and the other circuit in the sleep mode is transferred into each in a normal mode to perform the calibration of the analog-to-digital converter.

* * * * *